FIG.3D.
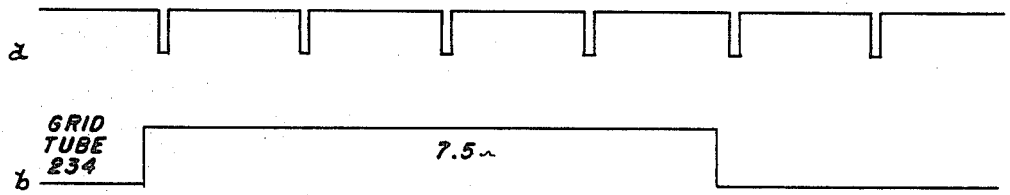
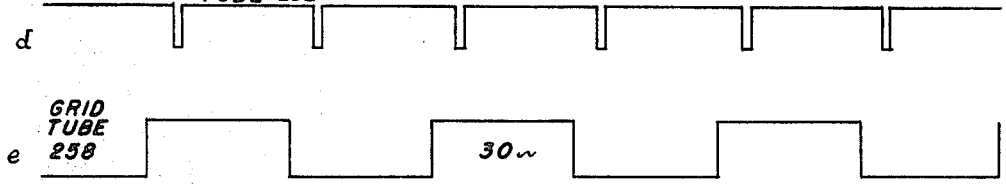
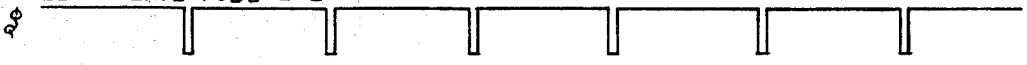
INVENTORS
William J. Shanahan
Richard F. Vetter
Edward I. Sacks
BY Cushman, Darby & Cushman
ATTORNEYS

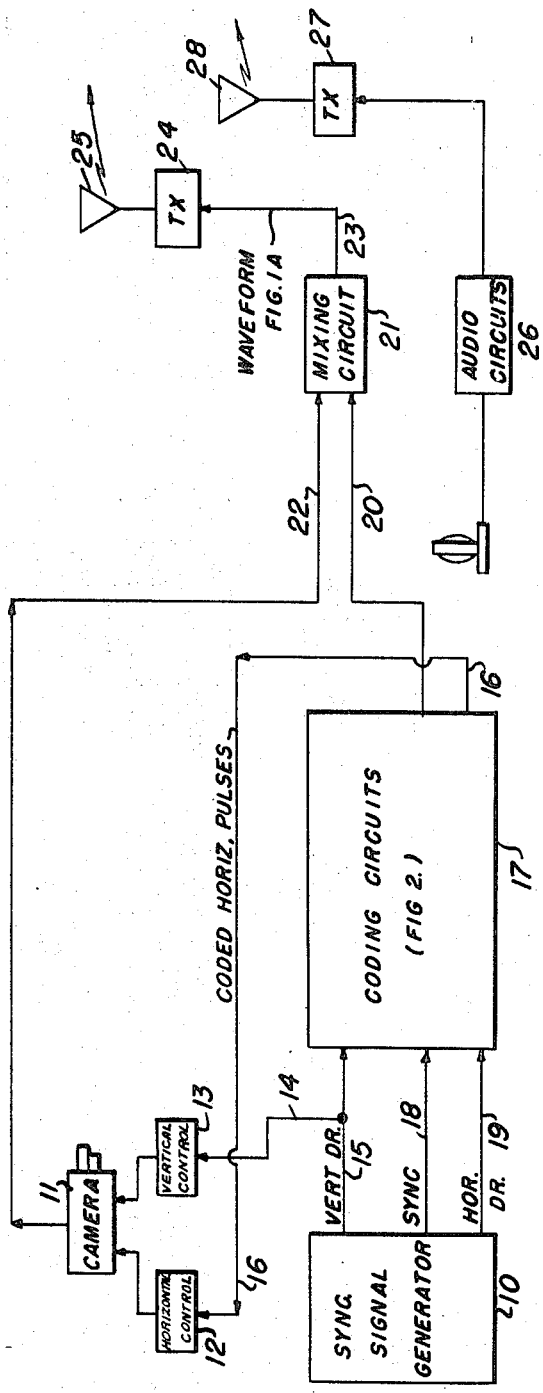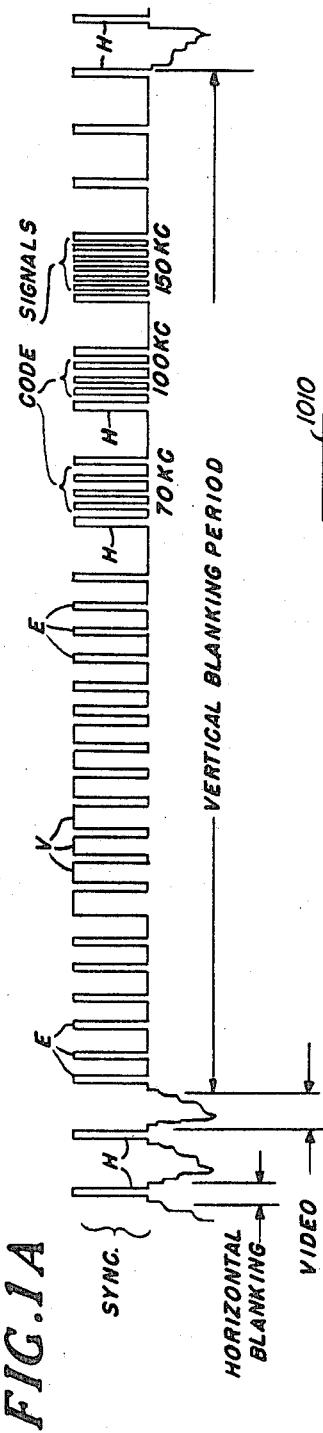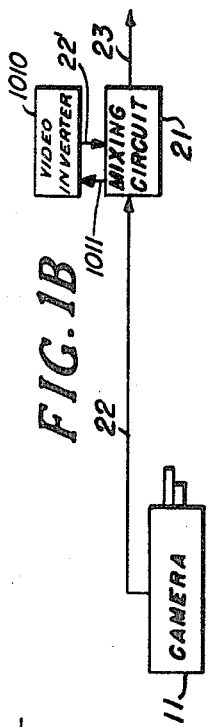

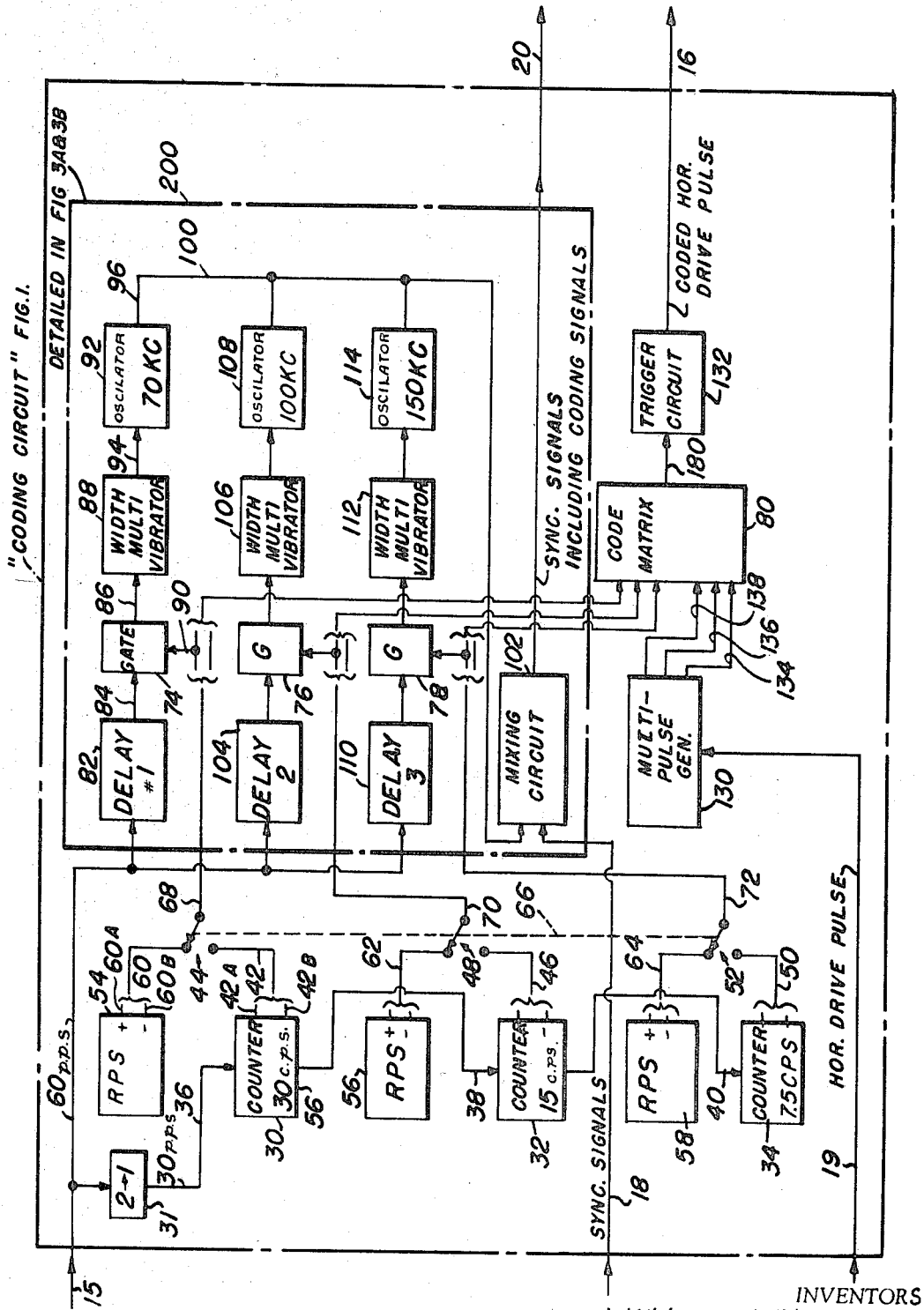

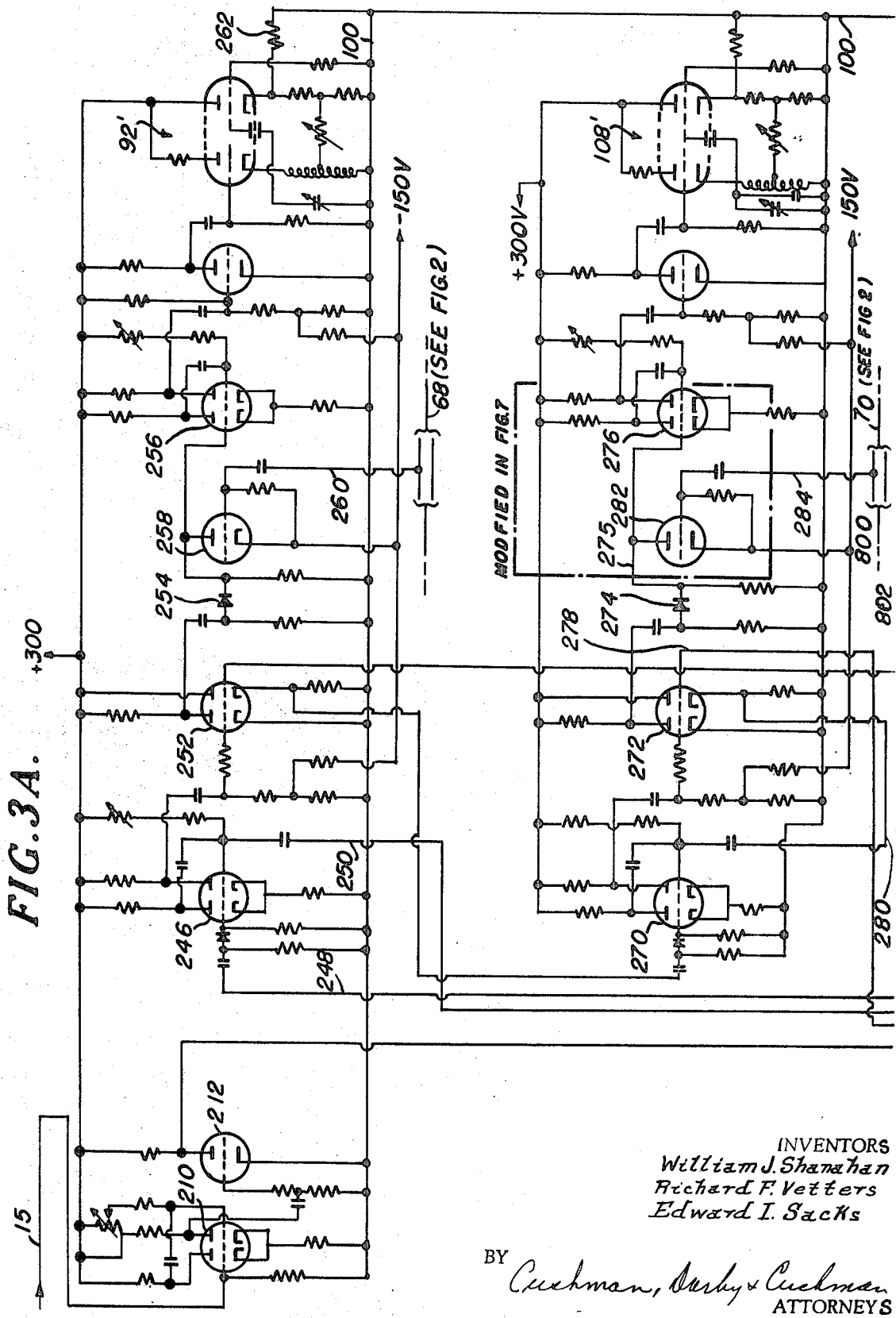

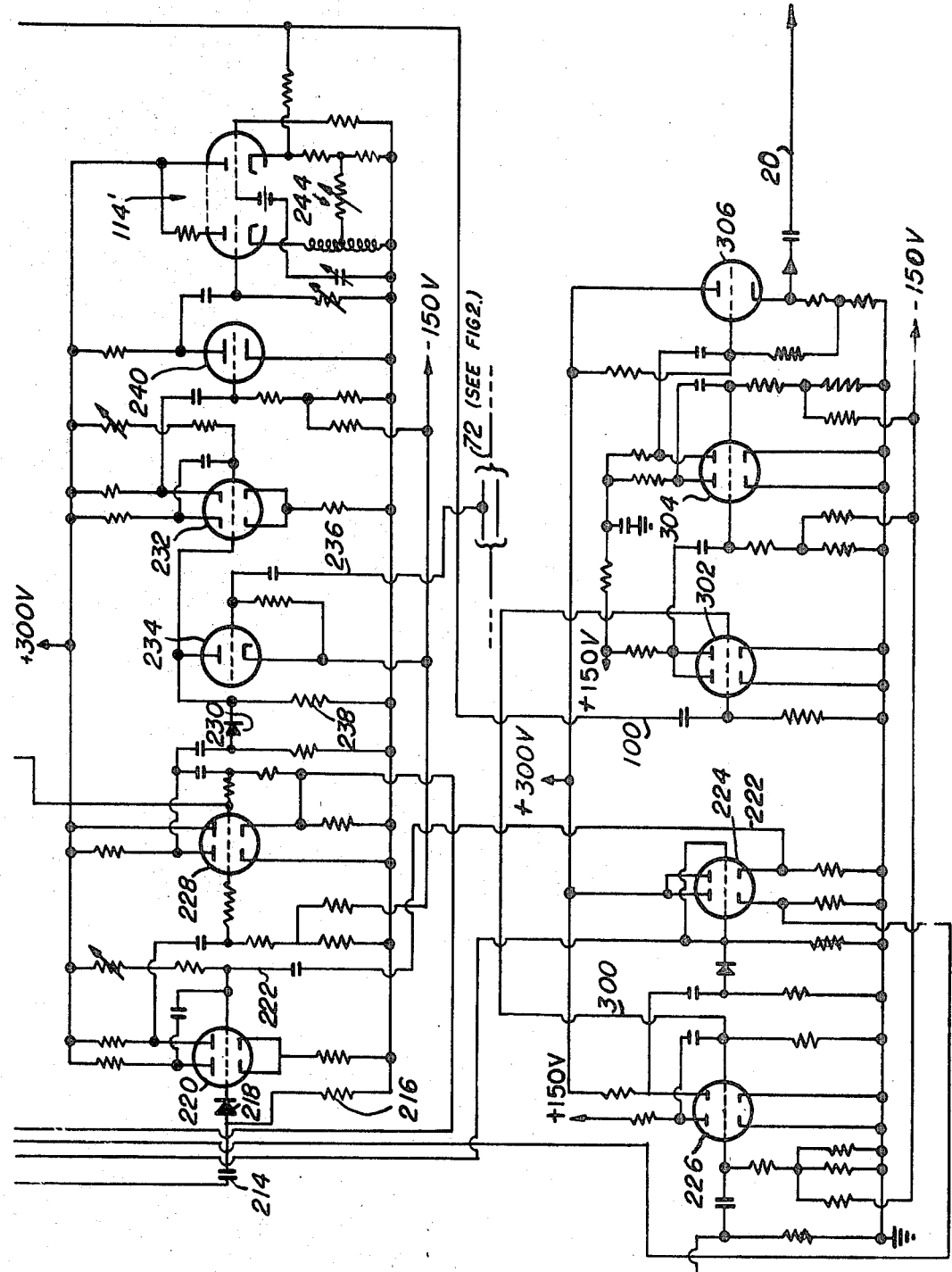

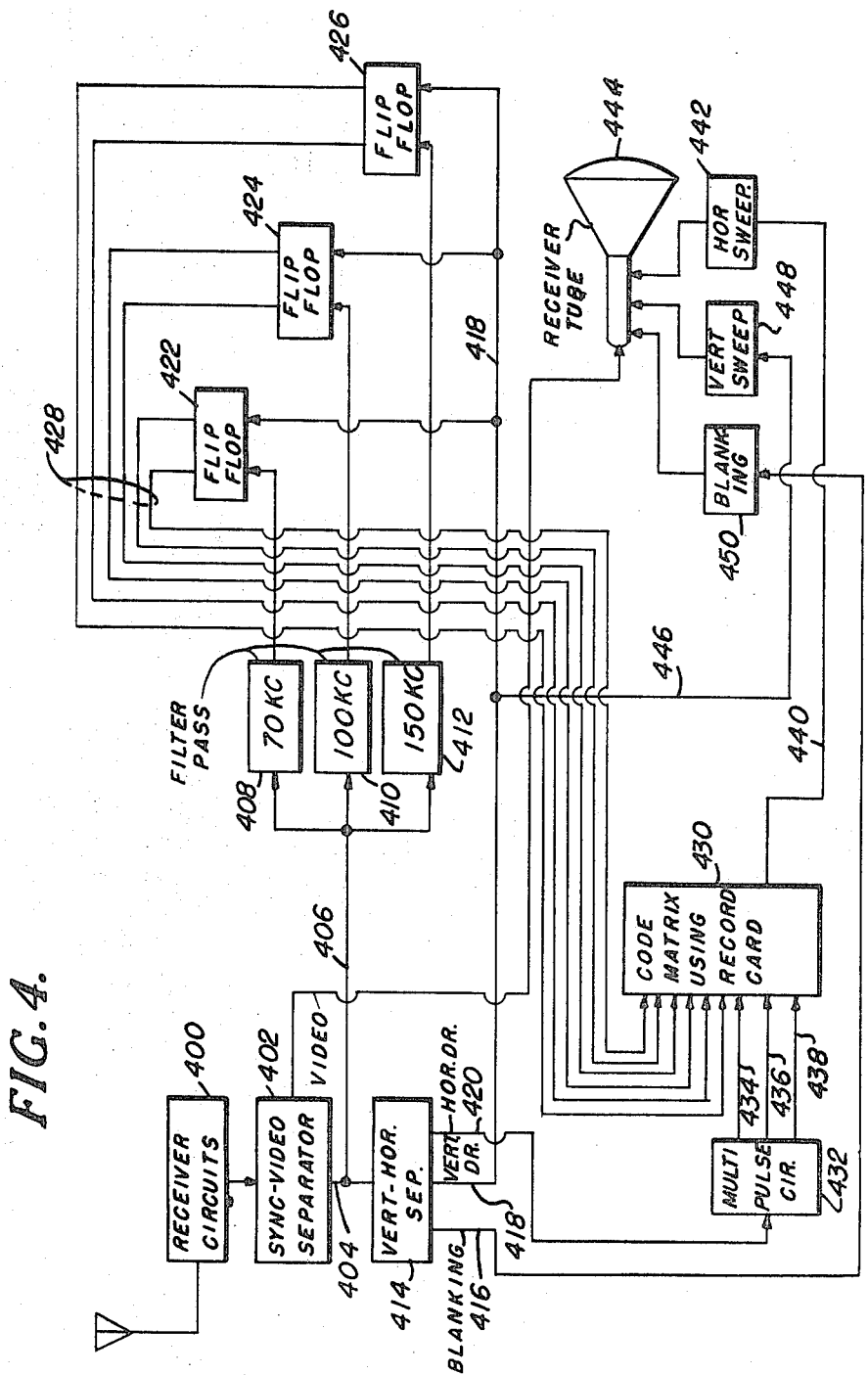

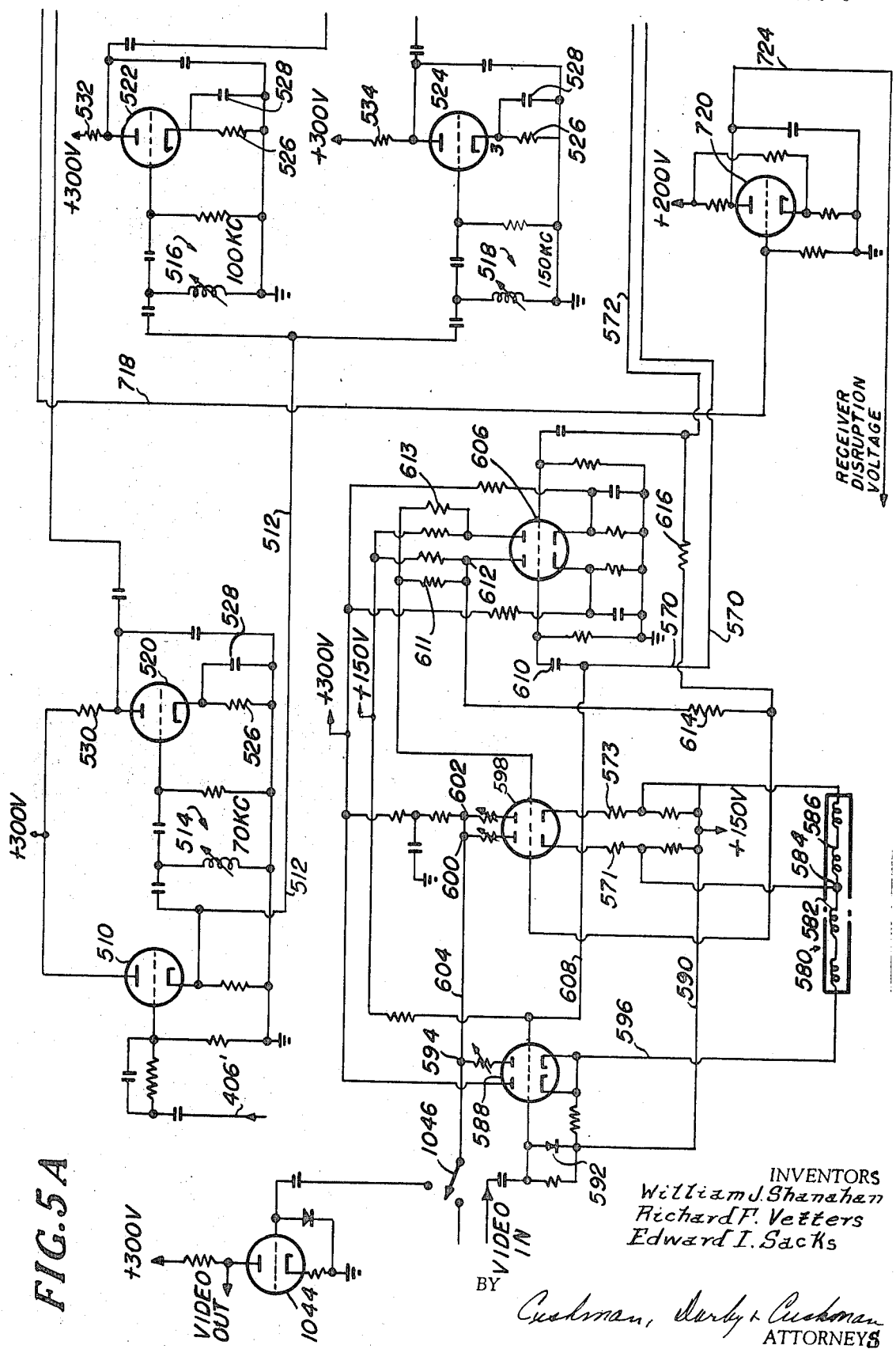

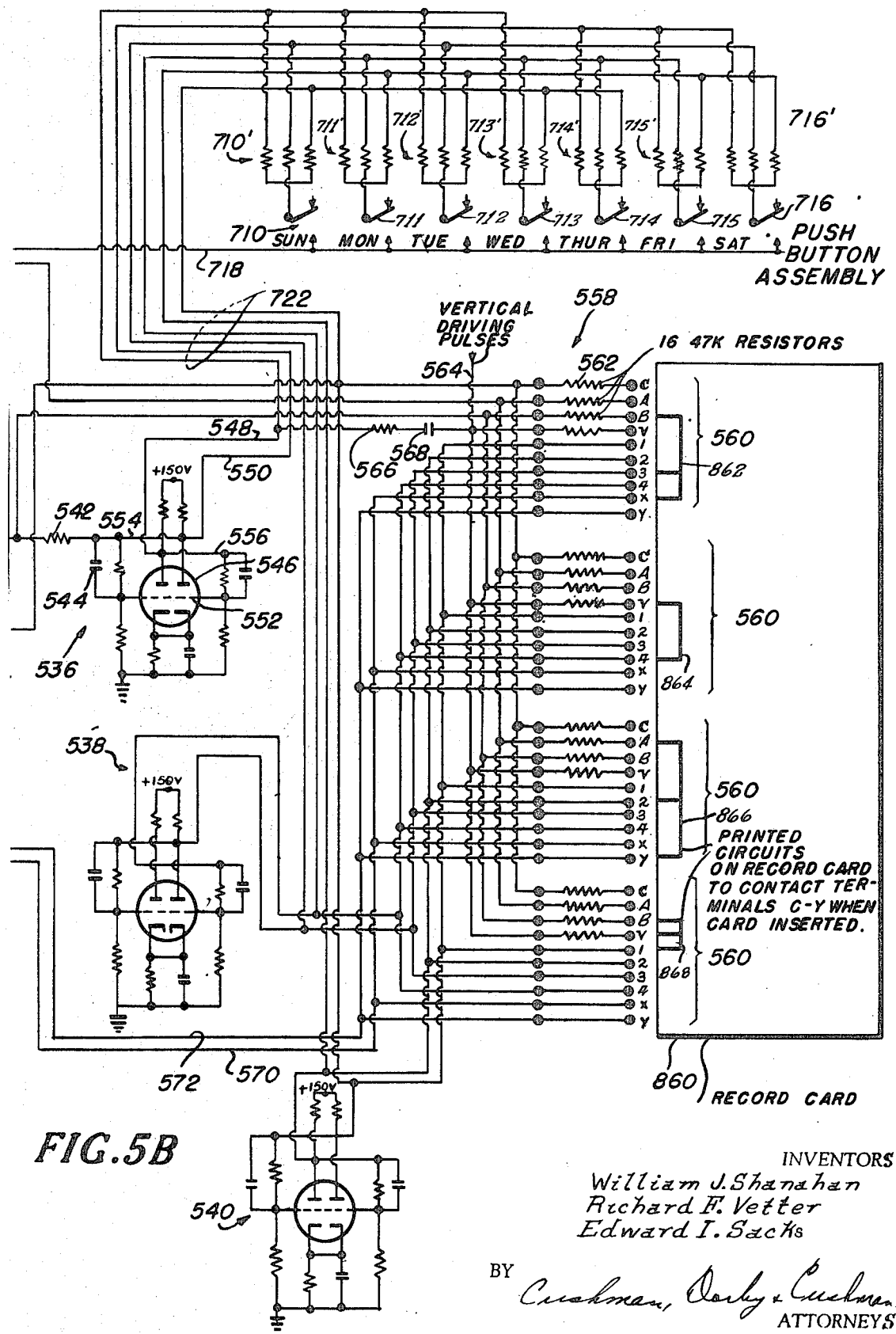

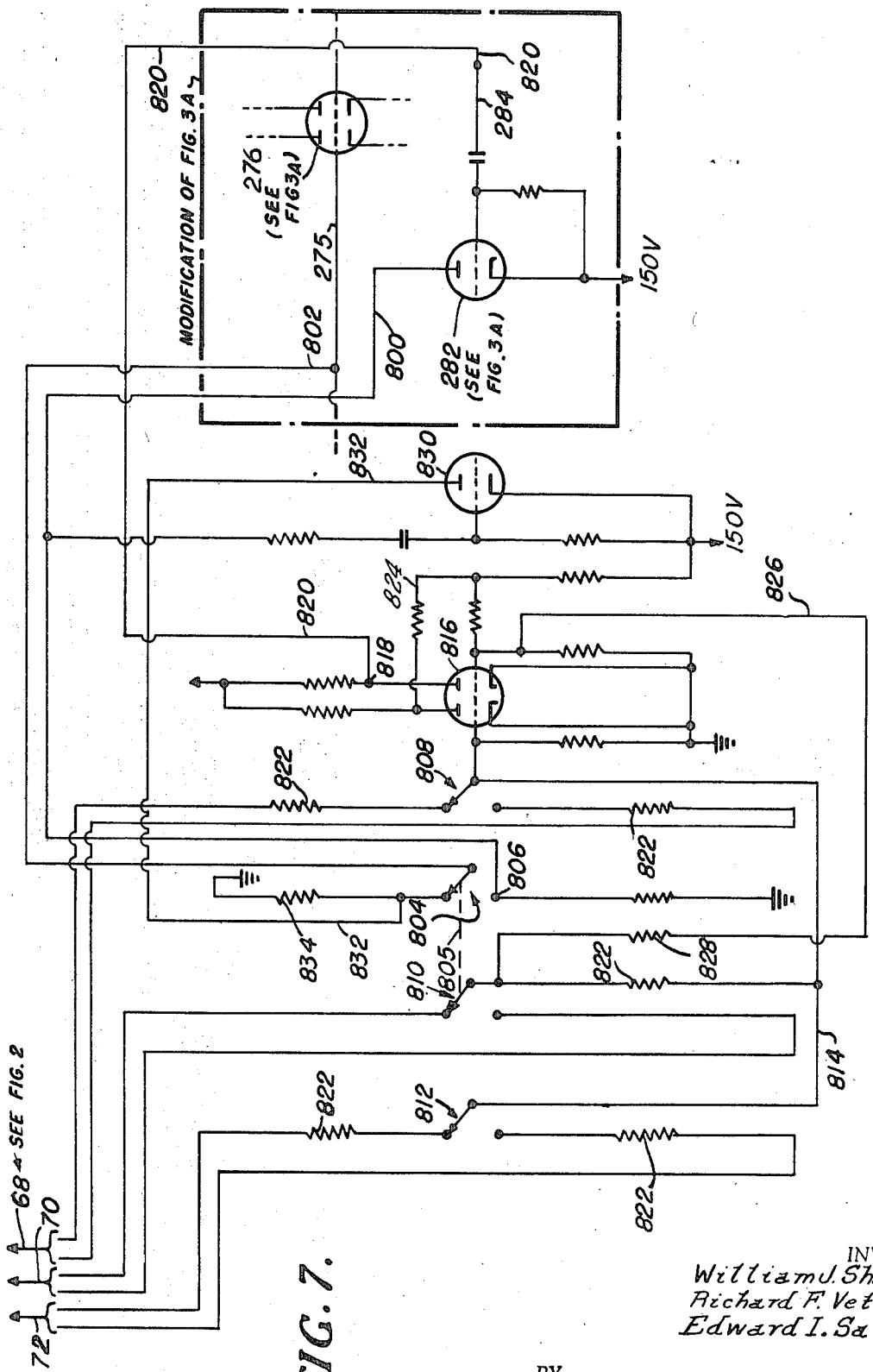

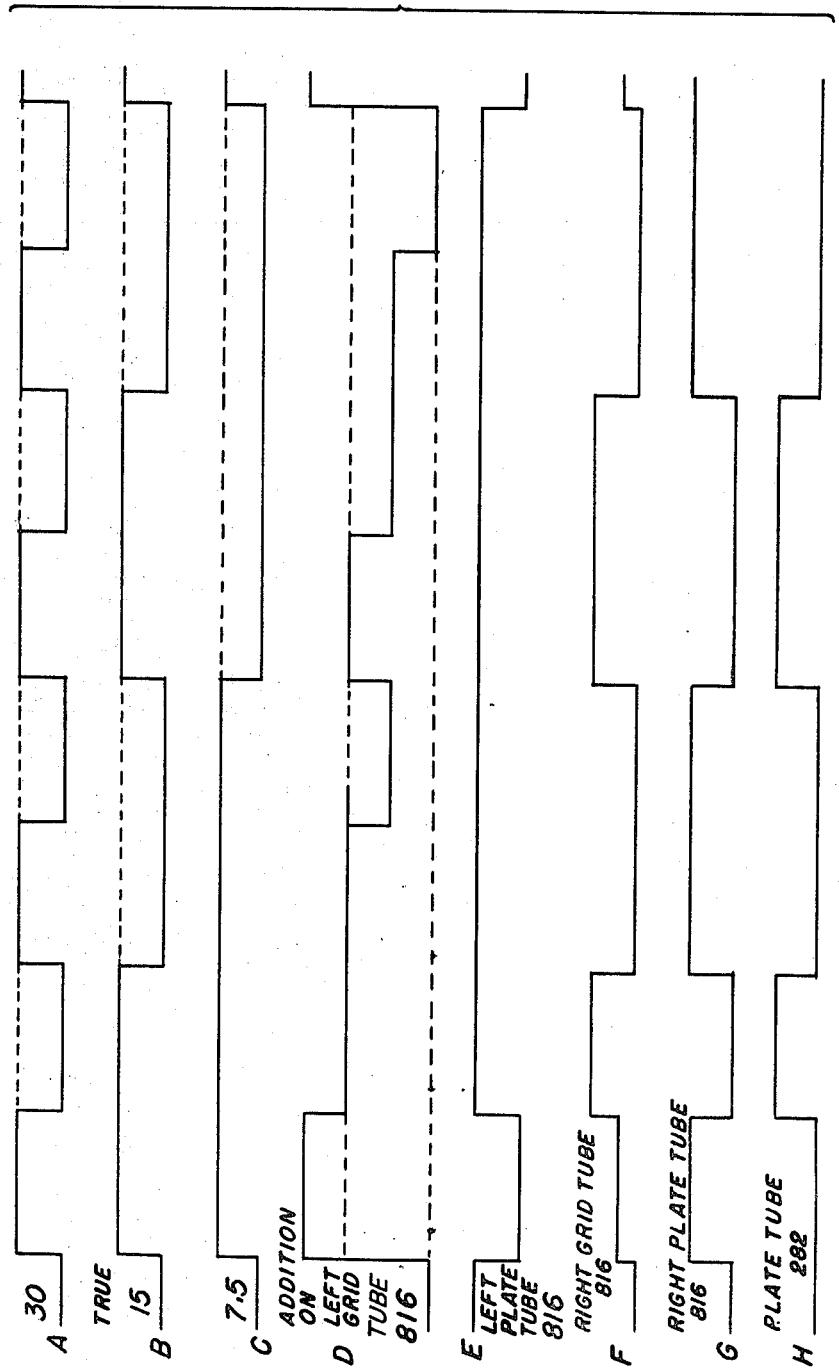

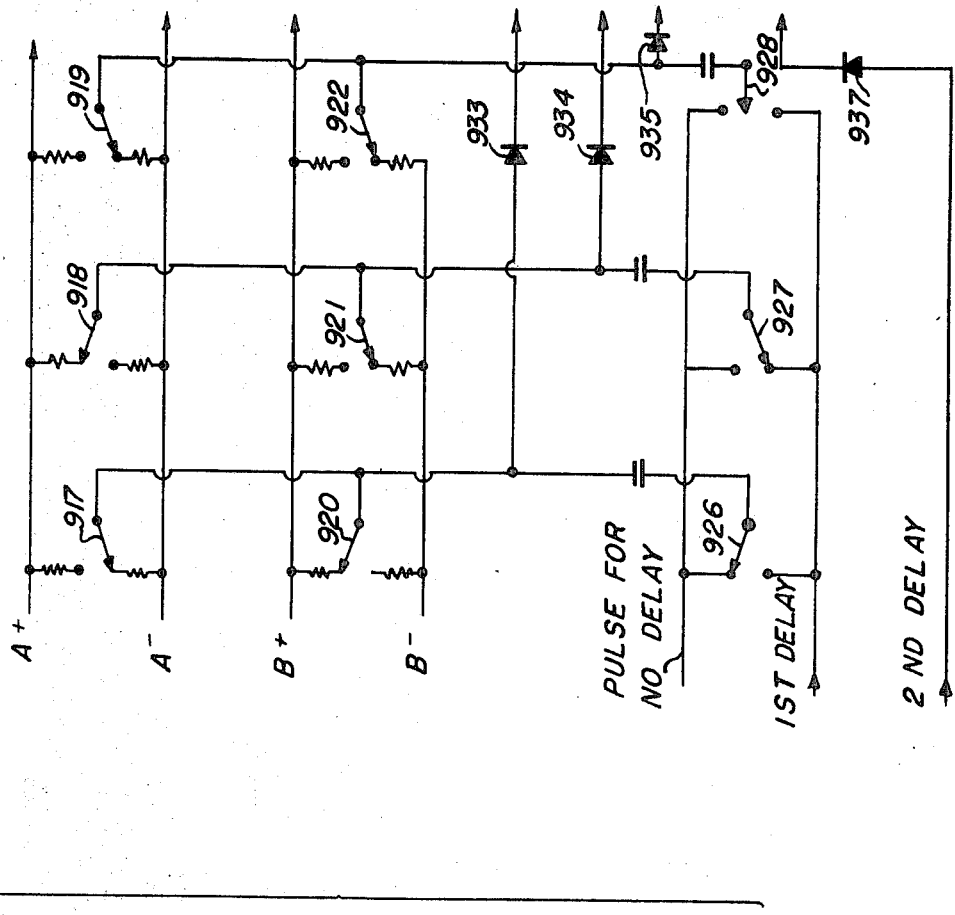
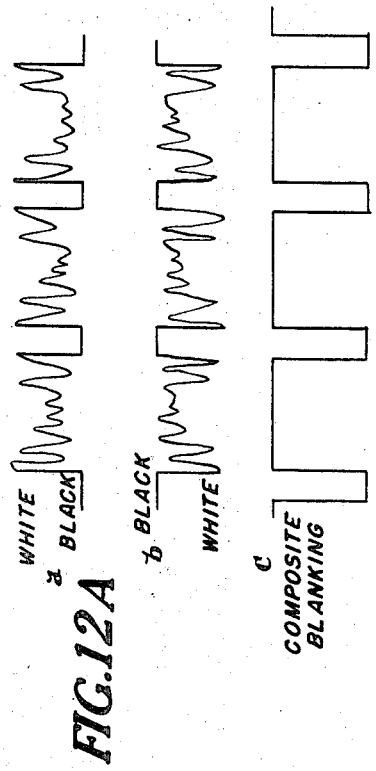

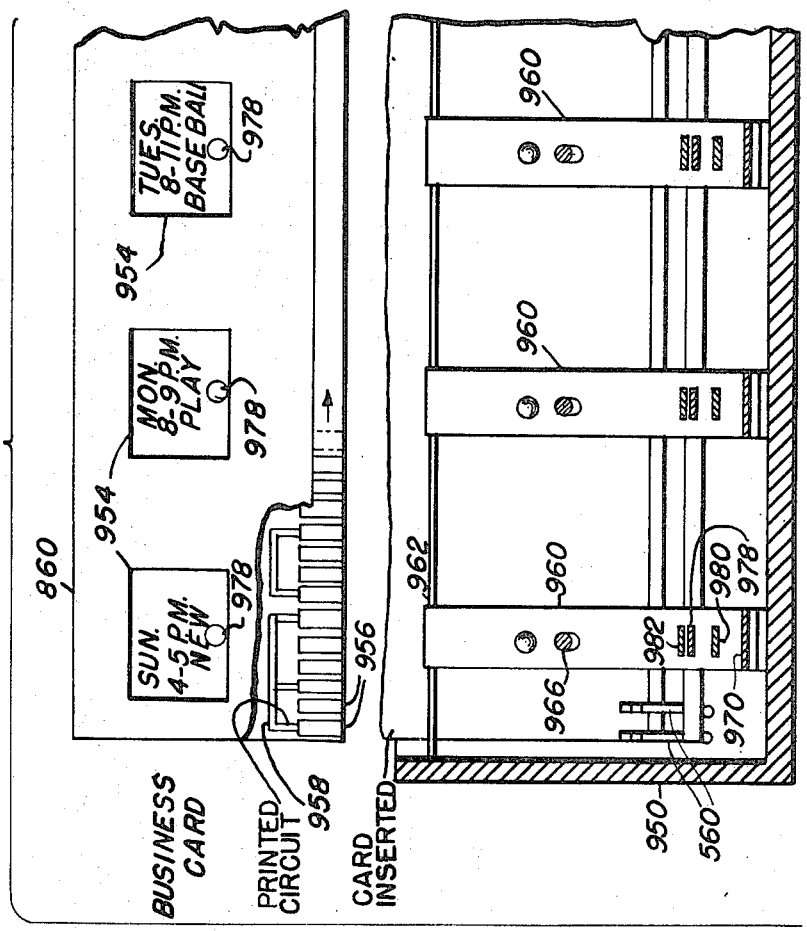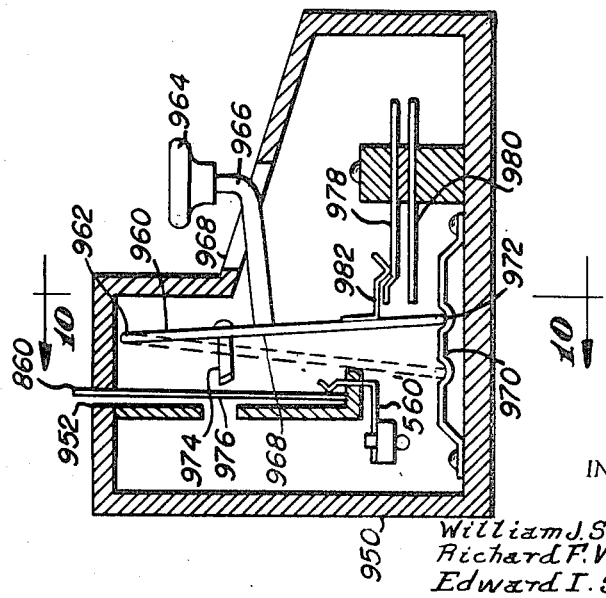

United States Patent Office 3,538,243
Patented Nov. 3, 1970

3,538,243
SUBSCRIPTION TELEVISION SYSTEM
William J. Shanahan, Whitestone, Richard F. Vetter, Huntington Station, and Edward I. Sacks, Briarcliff Manor, N.Y., assignors to Skiatron Electronics & Television Corporation, New York, N.Y., a corporation of New York
Continuation of application Ser. No. 418,642, Mar. 25, 1954. This application Sept. 23, 1965, Ser. No. 494,295
Int. Cl. H04n 7/16
U.S. Cl. 178—5.1
31 Claims

ABSTRACT OF THE DISCLOSURE

A system and technique for transmitting scrambled television pictures, preferably with record cards employed at the receiver for effecting the unscrambling of the video signals. Code information relating to the scrambled information is transmitted with the composite video and synchronizing signals and is decoded by a matrix of which the record card makes up a part to produce normal video signals for reproduction/code circuits utilizing delay lines for altering the received video signals to conform to a prearranged plan, and the use of a master code whereby the coding may be subdivided as by days, or weeks or the like to provide additional protection are also disclosed.

---

This application is a continuation of our application Ser. No. 418,642, filed Mar. 25, 1954, now abandoned. Therein as well as herein, the invention pertains to television systems and particularly to such systems for transmitting scrambled transmissions which cannot be intelligently viewed by other than authorized receivers.

This invention pertains in part to further improvements upon systems and techniques set forth in the copending applications of William J. Shanahan, Ser. No. 207,928, filed Jan. 26, 1951, now abandoned, Ser. No. 255,555, filed Nov. 9, 1951, now abandoned in favor of Pat. No. 2,924,645, and Ser. No. 316,485, now U.S. Pat. No. 3,274,333. In those applications there are described systems and techniques for transmitting scrambled television pictures preferably with so-called record or business cards being employed at the receiver for effecting the decoding or unscrambling of the picture. While telephone lines and other means of connection between transmitter and receivers may be employed for effecting the unscrambled operation, nevertheless record cards are preferable since they may be made available to authorized receivers by use of the mails and other convenient means of conveyance. The systems may be thus entirely free of requirement for other than radiation communication channels. Moreover, the complete transmission may be well within the confines of presently allocated frequency bands.

In accordance with the present invention, as a salient part thereof, improved arrangements and techniques are disclosed for transmitting code information on the same carrier frequency with the composite video and synchronizing signals. A further important aspect of the present invention is the provision of an arrangement for modifying the receiving circuits from time to time while a given code is being employed so as to in effect provide a number of subcode groups.

Accordingly, a primary object of this invention is to provide scrambled television transmission with code information being transmitted with the composite video and synchronizing signals.

A further object of the invention is to provide coding means whereby a master code may be subdivided as by days of the week or the like to provide additional code protection.

A further object of this invention is to provide a code circuit for use at least at the receiver end of the transmission utilizing delay lines for altering the received video signals to conform to a prearranged plan.

A further object of this invention conformable with the immediately preceding object is to provide a decoding circuit wherein video is first passed through a delay line and then selectively gated.

A further object of this invention is to provide a decoding circuit wherein video is first gated and then passed through a delay line.

A further object of the invention is to provide a circuit for inverting video signals in relation to existing blanking or synchronizing signals.

Many further objects and the entire scope of the invention will be in part expressed and in part obvious in the following detailed description of exemplary circuits according to the invention and limitation to the foregoing expressed objects is not intended.

The following description of exemplary circuits may be best understood with reference to the accompanying drawings, wherein:

FIG. 1 shows a block diagram of a transmitting circuit according to the present invention;

FIG. 1A shows composite synchronizing-video signals including code signals developed in the circuit of FIG. 1 according to the invention;

FIG. 1B shows a modification of the circuit of FIG. 1 for inverting video signals according to the invention;

FIG. 2A shows a chart of wave forms obtained in operation of the circuit of FIG. 2;

FIG. 2B shows a further chart of wave forms obtained in operation of the circuit of FIG. 2;

Figure 2:
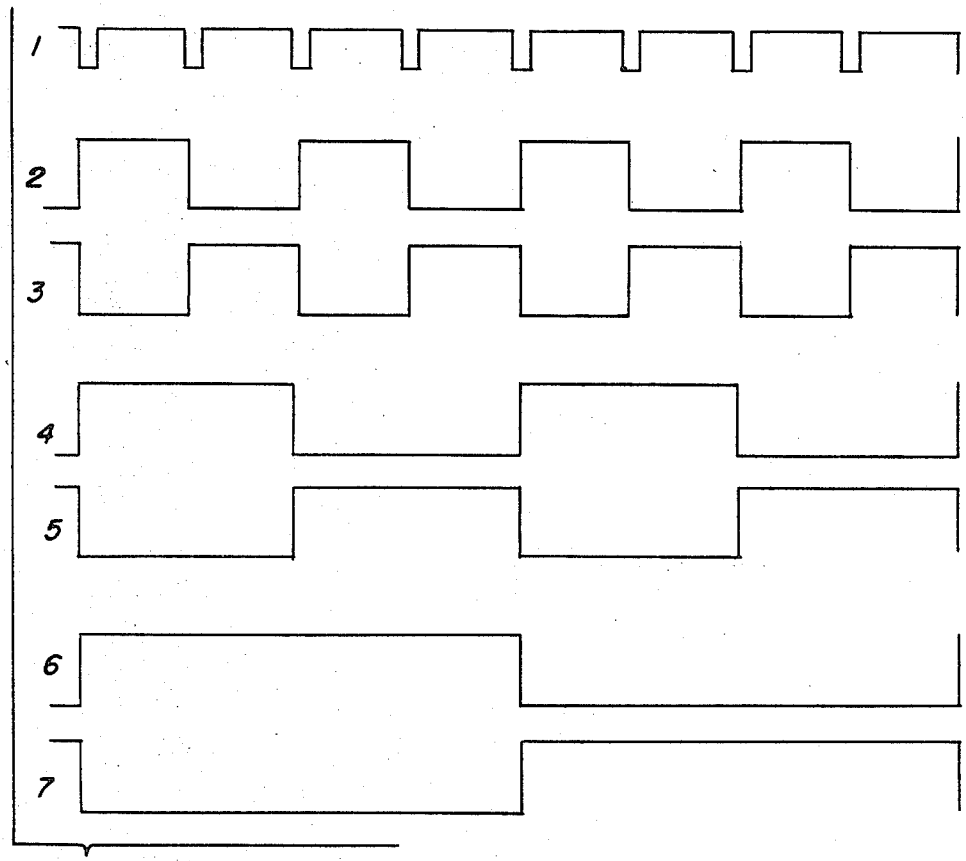
FIG. 2 shows a block diagram of the coding circuits of FIG. 1.
Figure 2:
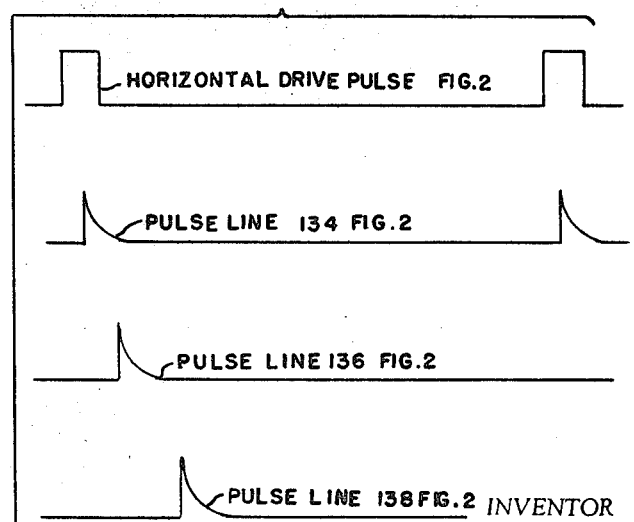
Figure 3C:
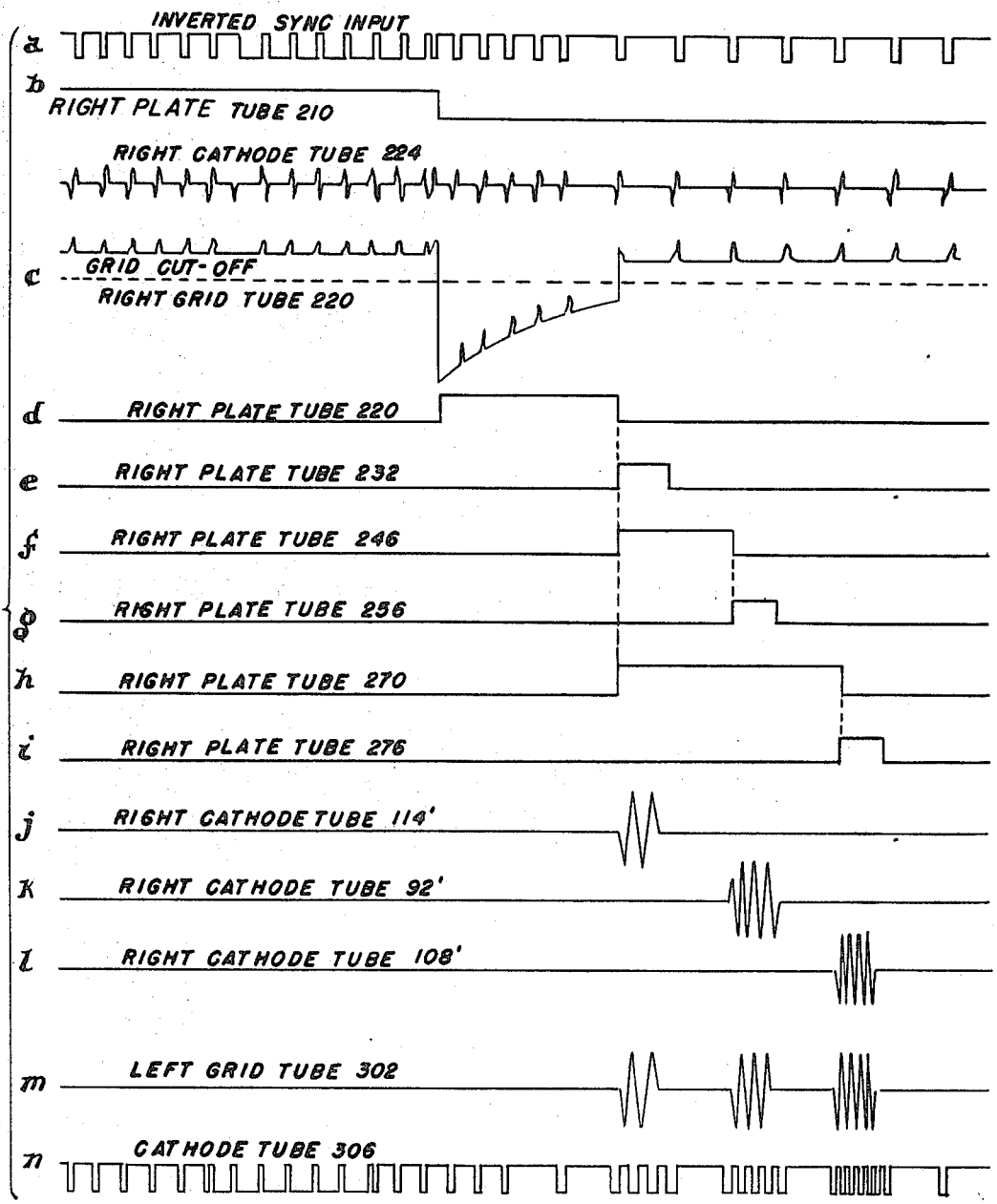
Figure 6:
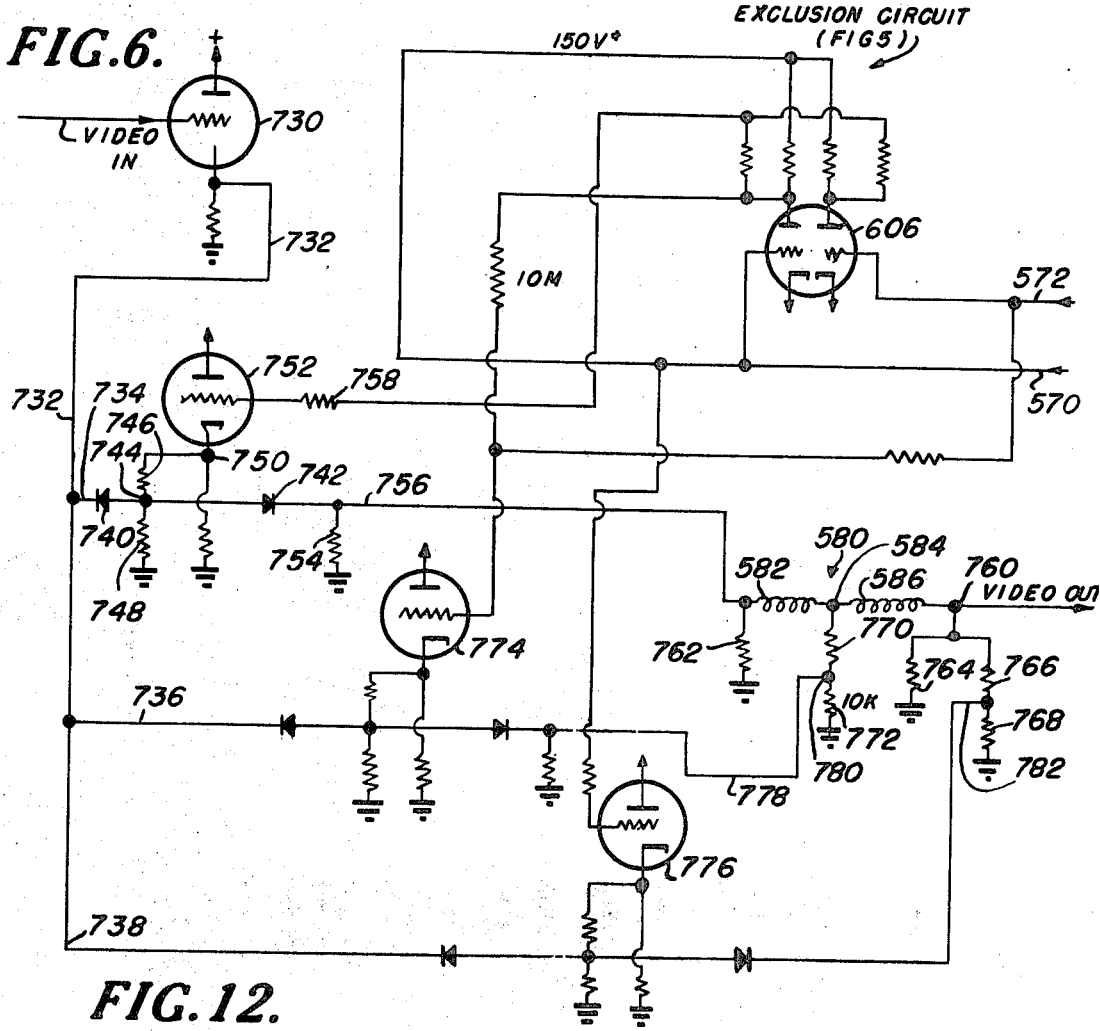
Figure 12:
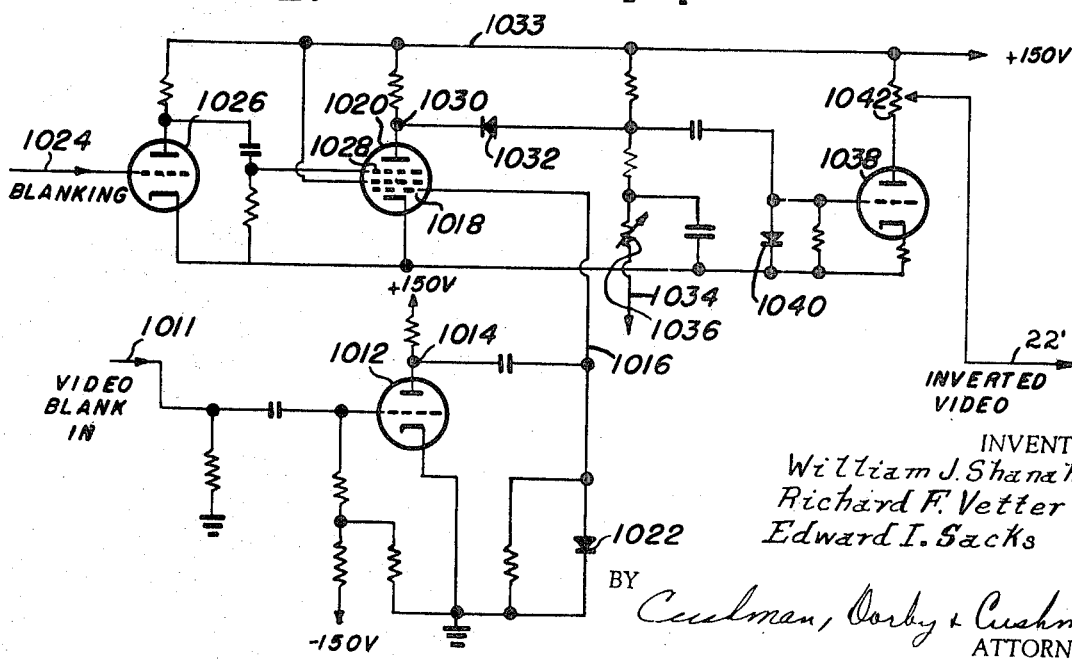

FIGS. 3A and 3B join to show schematic circuits for use within the chain line block 200 of FIG. 2;

FIG. 3C shows a chart of wave forms obtained in operation of the circuit of FIGS. 3A and 3B;

FIG. 3D shows a further chart of wave forms obtainable in operation of the circuits of FIGS. 3A and 3B;

FIG. 4 shows a block diagram of a receiver according to the present invention;

FIGS. 5A and 5B join to show schematic circuits of a receiver according to the present invention;

FIG. 6 shows a portion of receiver decoding circuit for passing video signals selectively through sections of a delay line;

FIG. 7 shows a schematic circuit for modifying the operation of the circuit of FIGS. 3A and 3B;

FIG. 8 shows a chart of wave forms obtained using the circuit of FIG. 7;

FIG. 9 shows a switching matrix circuit for use in the transmitting circuits of FIGS. 1 and 2;

FIG. 10 shows a cross-sectional view of a receiver decoding unit according to the invention;

FIG. 11 shows a longitudinal cross-sectional view of the decoding unit of FIG. 10, together with a record card positioned for insertion into the unit;

FIG. 12 shows a video signal inverting circuit according to the invention; and

FIG. 12A shows a chart of wave forms obtained in operation of the circuit of FIG. 12.

The first feature of the invention to be described is exemplified by a television transmitting station equipped to insert code signals into the composite video and synchronizing signals. Circuits illustrating this transmitter are shown generally in FIG. 1, in more detail in FIG. 2 and in still further detail in FIGS. 3A and 3B. The function of the transmitting system is to produce for transmission a combined video and synchronizing signal as represented in FIG. 1A. The composite signal shown in this figure is conventional, except for the presence of code signals so designated by legend.

In FIG. 1, reference character 10 designates a conventional circuit for developing so-called vertical and horizontal (sometimes called field and line) camera driving pulses and also synchronizing signals for subsequent mixing with the video signals for transmission. Reference character 11 designates a conventional television camera under control of sweep signals which are generated in horizontal control circuit 12 and vertical control circuit 13. The vertical control circuit 13 is directly connected through line 14 to the vertical drive output line 15 of the synchronizing signal generator 10. However, the horizontal camera control circuit 12 is connected by line 16 only with a coding circuit 17.

The coding circuit 17 also receives synchronizing signals from generator 10 over line 18 and horizontal drive pulses from generator 10 over line 19.

The coding circuit 17 will be further explained in detail below, but at this point it may be observed that the output of this circuit includes the previously mentioned line 16 which carries coded horizontal driving pulses and further includes synchronizing signals including the code signals shown in FIG. 1A, carried by line 20.

A conventional mixing circuit 21 is provided for combining the complete synchronizing signals available on line 20 with video signals from the camera available on line 22. The mixed signals on line 23 are applied to conventional transmitting circuits 24 for radiation from antenna 25.

Suitable audio circuits 26 may be provided, connected to transmitter 27 for radiation at antenna 28.

Referring now to FIG. 2, which shows in block diagram form the circuits within block 17 of FIG. 1, vertical drive pulses are applied over line 15, synchronizing signals are applied over line 18, and horizontal drive pulses are applied over line 19. The outut of the circuit includes line 20, carrying complete synchronizing signals including code signals, and line 16 carrying coded horizontal drive pulses. It will be noted that the input and output lines just mentioned are located and designated according to their designation and location in FIG. 1.

It will be understood throughout this specification that the terms horizontal and vertical are used in the sense known to those skilled in the art, without limitation to actual physical direction or dimension, the terms line and field being equivalent.

In FIG. 2, two distinct sources of pulses are available for creating code signals to be inserted between horizontal synchronizing pulses as indicated by legend in FIG. 1A. The first source of pulses is from a three-stage binary counter circuit which consists of first stage 30, second stage 32 and third stage 34. The first stage 30 is triggered at a predetermined rate by signals appearing on line 36. For reasons which will become more fully apparent hereinbelow, the line 36 may be conventiently connected with the vertical drive pulse line 15 and according to transmission standards in use in the United States at this time, counter stage 30 will be triggered at a rate of thirty cycles per second by stepping down field pulses from 60 to 30 per second in circuit 31. The second counter stage 32 is triggered in count step-down relationship by signals appearing on line 38 connecting the output of first stage 30 with second stage 32. Where the first stage 30 is operated at thirty cycles per second, the second stage 32 will operate at fifteen cycles per second. Similarly, the third counter stage 34 is triggered by pluses appearing on line 40 which are derived from the second counter stage 32. Accordingly, third counter stage 34 will operate at 7.5 cycles per second. It is thought unnecessary to describe a suitable counter chain in detail inasmuch as the circuits per se are well known to those skilled in the electronic arts to which this invention pertains. However, for a more complete description of a suitable counter chain, reference may be made to the above-mentioned Pat. No. 3,274,333 FIGS. 5 and 6 thereof.

In practice two outputs will be available from each of counter stages 30, 32 and 34, as suggested by conductors 42a and 42b extending from circuit 30. Each output of each circuit is available from the respective plate circuits of the binary circuit and the respective leads will carry opposite voltages, shiftable between like limits. Representative wave forms are shown in FIG. 2A. In line 1 of FIG. 2A pulses based on the vertical driving pulses are indicated, the outputs of circuit 30 indicated in lines 2 and 3, the outputs of circuit 32 indicated in lines 4 and 5 and the outputs of circuit 34 indicated in lines 6 and 7.

The output of counter stage 30 is on line 42 terminating at switch 44, the output of counter stage 32 is on line 46 terminating at switch 48 and the output of counter stage 34 is on line 50 terminating at switch 52, the understanding being continued that each of lines 42, 46 and 50 and the switches 44, 48 and 52 in practice may include two separate conductors.

As a completely separate source of pulses, the counter chain comprising stages 30, 32 and 34 may be replaced by three discrete sources of randomly occurring pulses. In FIG. 2 such random pulse sources are designated by reference characters 54, 56 and 58. Pulse source 54 is connected by line 60 to switch 44, source 56 is connected by line 62 to switch 48 and source 58 is connected by line 64 to switch 52. The movable contacts of switches 44, 48 and 52 are connected together as indicated by dash line 66 to operate in unison. When moved downwardly as shown in FIG. 2, the counter stages are connected to lines 68, 70 and 72. When the switches are in their upper positions as shown in FIG. 2, the lines 68, 70 and 72 are connected to the respective random pulse sources. Alternatively, switches 68, 70 and 72 may be actuated individually in order to permit random operation of some code groups, with regular transmission of other codes simultaneously.

The random pulse sources may be any well known source fired sporadically as by a free-running thyratron circuit. Details of such circuits are thought to be well known. However, for a detailed description of a suitable random pulse source, reference may be had to FIG. 7 of the above-mentioned copending application Ser. No. 316,485, now U.S. Pat. 3,274,333. The same square wave type of pulse will be produced by the random pulse sources as are shown in FIG. 2A. However, there will be no particular on-off relationship among the outputs of the various circuits, as is the case in the use of the counting stages.

It will be understood that each of the lines 68, 70 and 72 may include two separate conductors, carrying the opposed voltages.

The pulses on lines 68, 70 and 72 are for two purposes. The first purpose is for controlling electronic gate circuits 74, 76 and 78. The second purpose is to provide pulses to a code matrix circuit 80.

The purpose of gates 74, 76 and 78 is to control the application of code signals for mixing with the synchronizing signals. Each of gates 74, 76 and 78 is in a separate channel which is as follows: Vertical driving pulses on line 15 are applied to a first delay circuit 82. This circuit has the effect of delaying a pulse on output line 84 applied to gate 74 until the serrated vertical pulse and the following equalizing pulses (all as shown in FIG. 1A) have occurred. Thereafter, and immediately after a horizontal pulse in the vertical blanking period, the delayed pulse on line 84 appears. This pulse will be gated through gate 74 and over line 86 to a width multivibrator 88 if gate 74 is otherwise enabled by a signal available on a line 90 connected with one of the conductors of line 68. Whenever width multivibrator 88 is triggered, a short burst of oscillations of a given frequency, e.g., 70 kc. will be generated in oscillator 92, this circuit being triggered by signals available from multivibrator 88 over line 94. The output of oscillator 92 appears on line 96 connected to a mixing line 100 which extends to a mixing circuit 102.

In the channel of gate 76, a second delay circuit 104 is provided. The delay of this circuit is slightly more than the delay of circuit 82, both circuits being supplied with the same vertical driving pulses over line 15. The difference in delay of circuit 104 is just sufficient to place a burst of oscillations immediately after another of the horizontal synchronizing pulses in the vertical blanking. That is, whenever gate 75 is enabled by connection with line 70, and is also enabled by the output of delay 104, a width multivibrator 106 serves to trigger an oscillator circuit 108 to produce a burst of oscillations of the frequency differing from the frequency of oscillator 92, i.e., 100 kc. This burst of oscillations is also applied to mixing line 100.

In the channel of gate 78, circuit 110 delays one horizontal pulse period beyond the delay of circuit 104, to energize width multivibrator 112 and oscillator 114 to place another code burst, e.g., 150 kc. between another pair of horizontal pulses.

The mixing circuit 102 receives the various bursts of frequencies over line 100 and also receives the otherwise complete synchronizing signals over line 18. The output line 20 of mixer circuit 102, accordingly, carries the complete synchronizing signals including the coding signals. As has been stated previously, FIG. 1A is a representation of this total wave form. To carry the above examples into FIG. 1A, the left-hand group of coding signals is there indicated as being of 70 kc., the next of 100 kc. and the next of 150 kc. It will be understood that during a given vertical blanking period all three of the code signals may be present, or any one or more may be absent, depending upon the condition of gates 74, 76 and 78 during the particular vertical blanking period.

If the television receiver is equipped to respond to the code signals to alter some condition of the reception, the camera must be subject to corresponding codification. This is accomplished, for example, by the code matrix circuit 80 in cooperation with a multiple pulse generator 130 and a trigger circuit 132. What may be termed standard horizontal driving pulses are applied to multiple pulse generator 130 over line 19. The purpose of pulse generator 130 is to supply a plurality of time-spaced pulses all in timed relationship to the standard horizontal pulse arriving over line 19. Three pulses are given as an example. Three output lines from circuit 130 are provided, of which the first 134 may carry in effect the standard horizontal pulse. The second line 136 carries a pulse delayed a fraction of the time duration of a horizontal line from the pulse on line 134. The third line 138 carries a pulse still further delayed by a fraction of the time duration of the horizontal line from the pulse on line 136. A detailed explanation of the multiple pulse generating circuit 138 is thought unnecessary in this application, particularly in view of a suitable circuit shown and described in detail with reference to FIG. 11 of the above-mentioned copending application Ser. No. 316,485, now U.S. Pat. No. 3,274,333.

Typical wave forms appearing on lines 134, 136 and 138 are shown in FIG. 2B.

A suitable embodiment of a code matrix circuit 80 is shown in block 16 of FIG. 2 of Pat. No. 3,274,333. The output of circuit 80 appears on line 180 and consists of the particular one of the three input pulses selected for driving the camera during the sweeping of the next frame raster. The pulse on line 180 may be applied to trigger circuit 132 for producing whatever particular type of horizontal driving pulse is required for the camera horizontal control circuits 12. In the particular embodiment shown in FIGS. 1 and 2, the modification of the video is in the delay of the sweep of the horizontal lines with respect to what may be termed the standard horizontal signals being transmitted from antenna 25.

It will be understood that if a particular television receiver is not especially equipped, it will have its horizontal sweeps triggered under control of the standard horizontal driving pulses derived from the standard horizontal synchronizing signals. This will not be in accordance with the sweeping action at the camera and hence the picture will be confused. Specifically, the picture will be confused because the selection of pulses in code matrix circuit 80 will differ as from frame to frame or at some other coded rate.

It will be understood that delay of horizontal driving pulses to the camera is not the only means of confusing the picture on unauthorized receivers. Instead, the modification in the code matrix 80 may be relied upon to invert and reinvert the video from a negative to positive transmission at various times, etc. Various further techniques of picture confusion are discussed in said Pat. No. 3,274,- 333 mentioned above and the other applications mentioned therein. The present manner of modifying the camera drive is described herein detail only to give one specific embodiment as a basis for understanding a particular feature of the invention, which is the combining of code signals with the synchronizing signals.

While oscillators 92, 108 and 114 have been thus far described, no limitation thereto is intended. The code signals shown in FIG. 1A are groups of uniformly spaced pulses, differing only in repetition rate to provide a distinction therebetween. However, these signals may as well according to the invention be distinguished by being of different pulse width, pulse time delay, pulse number, pulse count, pulse amplitude, etc. In such cases, the oscillators would be replaced with suitable circuits for generating the desired signals.

With reference to the specific case of pulses of given petition rate, it will be understood that no limitation is intended to the exemplary rates of 70, 100 and 150 kc. Any other convenient frequencies may as well be employed.

Exemplary detailed circuits for providing the function of one embodiment of the circuit of FIG. 2 within the chain line 200 are shown in FIGS. 3A and 3B. In these figures the vertical driving pulses in the form of positive pulses are applied over line 15 to the left-hand grid of a twin triode 210 which is otherwise connected as a conventional cathode-coupled monostable multivibrator circuit. As will be well understood by those skilled in the art the positive pulse on the left-hand grid will cause conduction in the left-hand plate circuit, causing the right-hand grip to be moved negative to terminate conduction in the right-hand plate circuit, resulting in a sharp increase in the potential of the right-hand plate for a given period of time. This time period is determined by the time characteristics of the circuit. At a given delay time following the application of the pulse to the left-hand grid, the multivibrator will revert to its original condition, conduction will be resumed in the right-hand plate circuit and the potential of the right-hand plate will drop. Such drop in potential is indicated in line b of FIG. 3C. The purpose of the multivibrator circuit of tube 210 is to provide sufficient delay between the beginning of a vertical blanking period and the beginning of the first burst of frequencies comprising the code signals. In other word, at the beginning of the burst of oscillations from oscillator 92 shown in FIG. 2, line b of FIG. 3C is aligned with line a, wherein is shown the multivibrator period in relation to the vertical blanking period.

The positive pulse from the multivibrator of tube 210 is coupled to an inverter stage including triode 212 and the negative pulse from the plate of tube 212 is differentiated in a capacitive-resistance circuit consisting of capacitor 214 and resistor 216 (FIG. 3B). The negative overshoot is removed by crystal diode 218, leaving the positive pulse for application to the left-hand grid of a double triode tube 220 to which a conventional multivibrator circuit is connected. This multivibrator is adjusted to provide a relatively short delay, of a time duration of but one or two horizontal lines.

In order to insure that the burst of oscillation from oscillator 92 (FIG. 2) will start just after one of the standard horizontal pulses in the composite synchronizing signals (after the equalizing pulses but during the vertical retrace period) differentiated synchronizing signals are applied to the right-hand grid of tube 220. These signals are made available over a line 222 coupled to the right-hand cathode of a twin triode tube 224. The purpose of the cathode follower in the right-hand side of tube 224 is to isolate the multivibrator circuit of tube 220 from the various amplifiers which appear in the synchronizing signal circuits, to eliminate any feed-back problems. The synchronizing signals are obtained over incoming line 18 and are first amplified in two stages of amplification incorporated in the circuits connected to a twin triode tube 226 from which the synchronizing signals are applied simultaneously to the left-hand and right-hand grids of tube 224.

The synchronization of the end of the delay period of the multivibrator of tube 220 with the synchronizing signals comes about because the right-hand grid of tube 220 is exponentially rising, as indicated in line c of FIG. 3C. As it nears the grid cut-off level, one of the horizontal pulses obtained from the right-hand cathode follower of tube 224 will carry the grid above the cut-off level, thereby reverting the multivibrator at that instant, which is synchronized with the main synchronizing signals. The positive pulse appearing at the right-hand plate of tube 220 is coupled through an inverter stage in the left-hand side of a twin triode tube 228 and is differentiated and then passed through crystal diode 230 to remove the negative overshoot. The resulting positive pulse is coupled to the left-hand grid of twin triode tube 232 to which a conventional cathode coupled multivibrator circuit is connected. The multivibrator circuit of tube 232 comprises the multivibrator 112 of FIG. 2. This multivibrator is adjusted to be of time duration somewhat less than the line sweeping time.

Also connected to the left-hand grid of tube 232 is the plate of a triode tube 234, this tube serving as part of the gate circuit designated 78 in FIG. 2. The grid of tube 234 is supplied with positive enabling signals over line 236 which is coupled to one of the conductors of line 72. Line 72 carries the lower, e.g., 7.5 cycle per second gating pulses when a counter chain as shown in FIG. 2 is employed. At this point, it will be understood that notwithstanding the condition of the output of inverter stage of tube 228 and the differentiation and clipping action of crystal 230, no effective enabling or trigger pulse will be applied to the left-hand grid of tube 232 unless the grid of tube 234 is properly biased to open the gate. The gate of tube 234 operates by connection of the cathode of tube 234 to a negative 150 volt bias and the plate to ground through a resistor 238. Thus, when the grid of tube 234 is relatively positive, conduction through the tube will cause a voltage drop across resistor 238, placing the left-hand grid of tube 232 below ground and thus below a cut-off level. Under this condition none of the positive pulses being applied through crystal 230 can be effective to trigger the multivibrator of tube 232.

The right-hand plate of tube 232, serving as the output of the multivibrator circuit of this tube, is coupled through an inverter stage in tube 240 and the output of this stage is employed to trigger a typical pulsed Hartley oscillator circuit 114'. Oscillator 114' corresponds to oscillator 114 in FIG. 2. By using this type of pulsed oscillator instead of a gated class C oscillator, it is possible by means of feed-back to prevent damped oscillations after the burst of oscillations. A potentiometer 244 in the oscillator circuit may be employed to control the amount of feed-back and thus the linearity. The frequency of oscillations may be more or less anything distinct from the frequency of the horizontal pulses. For example, in keeping with the example previously assumed in FIG. 2, these oscillations may be at 150 kc.

The bursts of oscillations from oscillators 92 and 108 (FIG. 2) are generated in corresponding manner, the main difference being in the time of occurrence of the triggering of the oscillator circuits. The oscillator circuit in FIGS. 3A and 3B corresponding to oscillator 92 of FIG. 2 is designated 92' and the oscillator corresponding to oscillator 108 of FIG. 2 is designated 108'.

In the channel of oscillator 92' a multivibrator circuit serving as the width multivibrator 88 of FIG. 2 comprises twin triode tube 246. This multivibrator circuit has an input connected to the left-hand grid thereof and coupled over line 248 in a cathode follower circuit which includes the right-hand side of previously mentioned twin triode tube 228. Accordingly, the output of the multivibrator circuit of tube 246 occurs a predetermined time after the main delay after the width delay created in the multivibrator circuit of tube 220. This serves to place the bursts of oscillation from oscillator 92' between still other horizontal pulses in the vertical blanking period following the equalizing pulses, as will be clear from FIG. 1A.

The sequence of events can be more readily understood by reference to FIG. 3C where line d indicates the wave form on the right-hand plate of tube 220, the line e indicates the wave form on the right-hand plate of tube 232 and line f indicates the wave form on the right-hand plate of tube 246.

To lock in the termination of the delay of multivibrator tube 246, the right-hand grid is coupled over line 250 to the left-hand cathode of tube 224. This cathode is in a cathode follower circuit following the differentiated sync as simultaneously applied to both grids of this tube, all as previously described.

Notwithstanding that the trigger of the left-hand grid of tube 246 is already interlaced with the synchronizing signals, nevertheless the additional insertion of synchronizing signals at the right-hand grid is valuable in that it provides further stability.

The output of the right-hand plate of tube 246 is inverted in the left-hand side of twin triode tube 252. This output is differentiated and passed through crystal diode 254 to remove the negative overshoot. The resulting positive pulse is used to trigger a width multivibrator circuit connected to twin triode tube 256. This tube is only triggered, however, when a gate circuit connected to triode tube 258 permits the positive pulses available from the crystal diode 254 to be effective at the left-hand grid of tube 256.

The gate circuit of tube 258 is in all respects similar to the gate circuit in previously mentioned tube 234 with the exception that the enabling signal in this case is coupled over line 260 to one of the 30 cycle per second signals on line 68 from the counter chain comprising stages 30, 32 and 34. The output oscillations from oscillator 92' are available through a resistor 262 for mixing with the other oscillations onto line 100 (corresponding to line 100 in FIG. 2).

The channel of oscillator 108' operates in a manner similar to channels of oscillators 92' and 114' except that the delayed vertical driving pulses effective for triggering a delay multivibrator connected to tube 270 is based on the delay of the multivibrator circuit of tube 220, although conveniently using as a cathode follower the right-hand side of twin triode 252. The output of the multivibrator circuit of tube 270 is inverted in the left-hand side of twin triode 272. This inverted signal is differentiated and clipped at crystal 274 and applied to the width multivibrator circuit connected to twin triode tube 276. Differentiated synchronizing signals are applied to the right-hand grid of tube 270 after being obtained from the multivibrator 226 and coupled to the right-hand grid of tube 272 over line 278. The right-hand side of tube 272 is conveniently used as a cathode follower with the amplified pulses being applied to the right-hand grid of tube 270 by the coupling over line 280.

The right-hand grid of tube 276 is biased below cut-off by a gate circuit connected to tube 282, this gate being enabled over line 284 which is connected directly to one of the conductors of line 70 carrying the gating signals at 15 cycles per second from the counter chain.

Mixing of the bursts of oscillation on line 100 with the otherwise existing synchronizing signals on line 18 (FIG. 2) in mixer circuit 102 is accomplished, referring now to FIG. 3B, by connecting the amplified synchronizing signals available at the left-hand plate of tube 226 over line 300 to the right-hand grid of a twin triode tube 302. This tube has its plates connected in common to a single load resistance, and the line 100 is coupled to the left-hand grid. The result is that a mixed signal is available at the common plates. From the common plates the mixed synchronizing signals and bursts of oscillations, interrelated as shown in FIG. 1A, are coupled to two stages of limiting. The two stages of limiting occur in twin triode tube 304, using first the left-hand and then the right-hand side of this tube. The left-hand grid is biased to swing the tube from cut-off to saturation, thus squaring the signals at the left-hand plate. By means of similar biasing the output at the right-hand plate results in further squaring. The composite wave form available at the right-hand plate is then coupled to a cathode follower circuit including triode tube 306 which drives the output line 20.

For further understanding of the circuits thus far described with reference to FIGS. 3A and 3B, reference may be had to the remaining wave forms indicated in FIG. 3C, wherein line g indicates the wave form at the right-hand plate of tube 256, line h indicates the wave form at the right-hand plate of tube 270, line i indicates the waveform at the right-hand plate of tube 276, line j indicates the waveform at the output of oscillator circuit 114', line k indicates the waveform at the output of oscillator 92', line l indicates the output of oscillator 108', line m indicates the waveform at the left-hand grid of mixer tube 302, and line n indicates the total sync including groups of pulses based upon the bursts of oscillations.

Inspection of line n of FIG. 3C shows the result of limiting and squaring in tube 304. That is, the oscillations shown in lines j–m inclusive have become squared pulses of representation rate equal to the respective frequencies of the bursts of oscillations.

The operation of circuit of FIGS. 3A and 3B can be still further understood with reference to the wave forms indicated in FIG. 3D, these wave forms pertaining to the vertical pulse gating. Line a of this figure indicates the wave form at the left-hand plate of tube 228, line b indicates the wave form at the grid of tube 234 (at 7.5 cycles per second), line c indicates the wave form at the left-hand grid of tube 232, line d indicates the wave form at the left-hand plate of tube 252, line e indicates the wave form at the grid of tube 258 (at 30 cycles per second), line f indicates the wave form at the left-hand grid of tube 256, line g indicates the wave form at the left-hand plate of tube 272, line h indicates the wave form at the grid of tube 282 (at 15 cycles per second) and line i indicates the wave form at the left-hand grid of tube 276. Lines j and k of FIG. 3D indicate operation under modified conditions, as described hereinbelow.

Referring now to FIG. 4, the received signals are detected in the receiver circuits 400 and the synchronizing signals including the code signals are separated from the video signals by separator circuits 402. These synchronizing signals are available on line 404 and are applied over branch line 406 to the inputs of three filter circuits 408, 410 and 412. The synchronizing signals are further separated as to vertical and horizontal signals in separator circuits 414. Outputs of this circuit include blanking signals on line 416, vertical drive pulses on line 418 and horizontal drive pulses on line 420. The horizontal drive pulses on line 420 are standard pulses, as contrasted to the coded horizontal pulses employed at the transmitter end of the system for driving the cameras.

The function of the respective filters 408, 410 and 412 is to pass only the bursts of code pulses, to the exclusion of all other of the synchronizing signals. Conformably with the oscillators 92, 108 and 114 of FIG. 2, filter 408 may pass only for example 75 kc., filter 410 may pass only 100 kc. and filter 412 may pass only 150 kc. All other frequencies are suppressed. Suitable filter circuits will be understood by those skilled in the art and furthermore an example of a suitable circuit will be described hereinbelow.

For re-establishing the modification to the transmission, in accordance with one embodiment of the invention, three Eccles-Jordan or flip-flop circuits 422, 424 and 426 are provided, each having one input connected to one of the filter circuits. That is, the output of filter circuit 408 serves as one input to flip-flop 422, the output of filter 410 connects to an input of flip-flop 424 and the output of filter 412 connects to an input of flip-flop 426. The second input of each flip-flop circuit is connected to line 418 on which appear the vertical drive pulses. Still other arrangements are possible, as will be shown hereinbelow.

Each flip-flop is provided with two outputs, which, as will be well understood, will carry opposite voltages. The outputs of the three flip-flops are available on the lines designated collectively by reference character 428. These lines are applied to a code matrix 430 which may use a record card to complete the switching or other functions thereof. For purposes of the present explanation the code matrix, notwithstanding what device may be used for switching, may be the same as the code matrix 80 of FIG. 2. Reference is further made to Pat. No. 3,274,333 for a detailed description of suitable matrix using a record card. Still further examples will be given hereinbelow.

The standard horizontal drive pulses on line 420 are applied to a multipulse circuit 432, which may be exactly as circuit 130 of FIG. 2. Three pulses spaced apart in time will be available on the lines 434, 436 and 438, for application to the code matrix 430. The output of the code matrix 430 appears on line 440 as the desired pulse, which will conform at any instant of time to the pulse employed to drive the cameras, the pulse on line 440 being applied to horizontal sweep control circuits 442 to control the horizontal sweep of the receiver tube 444.

The standard vertical driving pulses on line 418 are applied over branch line 446 to vertical sweep control circuits 448. The blanking signal available on line 416 is applied to blanking control circuits 450.

FIG. 4 is intended to show a basic system for utilizing code signals appearing in the synchronizing signals, this circuit otherwise conforming closely to the receiver circuit specifically disclosed in Pat. No. 3,274,333. Actually, the present invention includes further specific embodiments, which embodiments provide further features of invention beyond that shown in FIG. 4. However, the further embodiments now to be described show detailed filter and flip-flop circuits applicable to the circuit of FIG. 4.

Referring now to FIGS. 5A and 5B, an embodiment of a receiver is shown wherein the video signals are selectively delayed with respect to standard horizontal driving pulses employed to drive the receiver sweep circuits. This is to be distinguished from the arrangement in FIG. 4 where delayed driving pulses are generated and employed to reconstruct the scrambled transmission. The circuit of FIG. 5 also shows other features not shown in FIG. 4.

In FIG. 5A it may be assumed that the transmitting signals are received, detected and separated and the synchronizing signals appear on line 406', corresponding to line 406 in FIG. 4. From this point on the circuits differ as follows: the synchronizing signals on line 406' are applied to a cathode follower circuit comprising tube 510 and from the cathode circuit there are available on line 512 all of the synchronizing signals, including the bursts of code frequencies shown in FIG. 1A. The signals on line 512 are applied to a plurality of tuned circuits, three being shown, designated 514, 516 and 518. The circuit 514 may be tuned to resonate at one of the code frequencies, e.g., 70 kc. Circuit 516 may be tuned to resonate at another code frequency, e.g., 100 kc. and circuit 518 may be tuned to resonate at still another code frequency, e.g., 150 kc. Signals corresponding to each of these bursts of frequency appear on the grids of tubes 520, 522 and 524, these grids being connected to tuned circuits 514, 516 and 518, respectively. The tubes 520, 522 and 524 are operated as plate detectors. High value cathode resistors 526 are provided for each tube to allow the detectors to select only the stronger or tuned signal, despite variations in the amplitude of the signals appearing at the cathodes of the tubes. The resistors 526 are bypassed by relatively large condensers 528. Thus, the cathodes of tubes 520, 522 and 524 are allowed to charge up to a voltage approximately equal to the peak voltage of the tuned wave forms appearing on the grids of these detectors. The plate wave forms of these detectors contain, therefore, only the desired signals and in the form of negative pulses across the plate resistors 530, 532 and 534. These negative pulses are employed for the purpose of triggering flip-flop circuits during the vertical blanking interval to retain or remember the code situation during the scanning of the next horizontal line. Output from the flip-flops, thus remembering the code situation, are employed for the selection of a proper video wave form.

The just mentioned flip-flop circuits are designated 536, 538 and 540 (FIG. 5B). These three circuits are shown, although the minimum of two and a maximum of any number of such circuits may be employed within the scope of the invention.

The exact nature of the circuits 536, 538 and 540 will be well known to those skilled in the art. Therefore, it is thought that no further explanation is necessary beyond the circuitry shown in FIG. 5B. It will be understood, now referring to circuit 536 as an example, that a negative pulse applied through resistor 542 to the left-hand grid of the tube 546 to which the circuit is connected, will cut off conduction in that side of the tube, and establish conduction in the opposite or right-hand side of the tube, assuming such original conducting situation. When such transfer of conduction occurs, the plate voltages on both sides of the tube will reverse from relatively high to relatively low values, and vice versa. Output from the left-hand plate is taken on line 548 and from the right-hand plate on line 550. It will further be understood that a negative pulse applied to the right-hand grid 552 of circuit 536 will cause a similar reversal. It will further be understood that a repetition of negative pulses on any one grid will first shift the circuit to a given position, if it is not already so shifted, and there will be no further reversal until a negative pulse is applied to the other grid.

It will be further understood that a negative pulse applied to the plate circuits as by application to line 548 or line 550 will also create a shift of the circuit 546. This is by reason of coupling of the right-hand plate to the left-hand grid through line 554 and coupling of the left-hand plate to the right-hand grid by line 556.

The negative pulses available at the outputs of the detector circuits comprising tubes 520, 522 and 524 are not immediately applied to the flip-flops 536, 538 and 540— except in the exemplary circuit shown, for one connection, from the plate of tube 522 to the left-hand grid of circuit 536. Instead, the negative pulses from the detector tubes are applied to a bank of circuits including portions of a resistor matrix, which circuits are preferably completed by insertion of a record card having decoding information thereon. It will be noted that this connection differs from that shown in FIG. 4. It will be understood that manually operated switches and other switching means can also be employed, although record cards are preferred. This bank of circuits is designated generally as 558 and includes repeated sets of terminals embraced by brackets 560. Each terminal in each set of terminals is designated by legends C, A, B, V, 1, 2, 3, 4, X and Y. Referring first to the uppermost set of terminals 560 in FIG. 5B, terminal C is connected through a resistor 562 to the plate of detector tube 524. Assuming the previous example, that the tuned circuit 518 will resonate at 150 kc., a negative pulse will appear at terminal C whenever a burst of 150 kc. is detected at tube 524. Correspondingly, terminal A is connected to the plate of tube 522. Thus, there are available at terminals A, B and C, the negative pulses whenever corresponding bursts of frequencies are detected.

The terminal designated V is connected to line 564 which will carry negative pulses corresponding to the vertical driving pulses developed in the receiver. These pulses are coupled to the terminal V as stated and also coupled through resistor 566 and condenser 568 to the left-hand plate and right-hand grid of flip-flop circuit 536.

The remaining terminals off the groups 560 are connected as follows: 1 is connected to the right-hand plate of circuit 540, 2 is connected to the left-hand plate of circuit 540, 3 is connected to the right-hand plate of circuit 538, 4 is connected to the left-hand plate of circuit 538, X is connected to a decoding circuit over line 570 and Y is also connected to the decoding circuit over line 572.

It will furthermore be noted in FIG. 5B that each of the terminal sets 560 are connected in parallel, one with each of the others. This provides for convenience whenever a record card having a printed circuit is inserted in a suitable device (to be described below) for contact with each of the terminals of each of the terminal blanks. By having a plurality of parallel connected terminals available, one advantage is that need for cross-over in printed conductors is avoided.

In one manner of using the circuit of FIGS. 5A and 5B the vertical pulses on line 564, that is, negative pulses occurring at times related to the vertical serrated synchronizing signal, may be employed to clear the previous condition of the flip-flop circuits, in readiness for establishing another coded relationship upon receipt of the bursts of code frequencies. The pulse on line 564 will in the circuit shown in FIG. 5B establish conduction in the left-hand side of flip-flop 536 and will also enter the card, so to speak, through the V terminal of each bank of terminals 560. The routing through the printed circuits of the card (or other switching arrangement) may be such as to cause the pulse to reappear at any one of terminals 1–4 of each bank 560. It may be assumed, for example, that the pulse is returned at terminal 2. In this case, the left-hand side of flip-flop 540 will be placed in its conducting state. If it be further assumed that the vertical pulse is also simultaneously returned through terminal 4, the flip-flop circuit 538 will also be set to conducting in its left-hand side. In this assumed situation, the vertical pulse on line 564 will have set each of the flip-flop circuits to conduction in the respective left-hand sides thereof. It nevertheless will be apparent that should the vertical pulse be returned through terminal 1, flip-flop circuit 540 would be in its right-hand state, and if returned through terminal 3, flip-flop circuit 538 would be in its right-hand state. It is clear that a large combination of settings of the flip-flops can be readily achieved.

As will be understood at this point, the function of flip-flop circuits 536, 538 and 540 is at least in part to hold or remember during the scanning of a complete line, a given situation developed by the triggering of the flip-flops by the burst of frequencies during the vertical retrace period. Accordingly, various connections are to be made between the terminals connected to the plates of the flip-flop circuits, since it is the plate circuits which maintain the information of record during horizontal scanning periods. In the particular circuit shown in FIG. 5B, the plates of flip-flop 536 are not directly connected to the terminals 1–4. On the contrary, only the plates of circuits 538 and 540 are so connected. These connections have been previously traced. It follows that by means of the record card there may be connection made between one or more of the terminals 1–4 and the terminals X and Y, the purpose being to establish during the horizontal scanning period a voltage condition on line 570 and on line 572. With two lines involved, four conditions may obtain: first, no signal on 570 or 572; second, a signal on both 570 and 572; third, a signal on 570 but not on 572 and, fourth, a signal on 572 but not on 570.

The possibilities of setting up various of these situations in response to the code signals is unlimited for practical purposes. For example, it will be immediately observed that the first burst of code frequency may be employed to set a given flip-flop to a given condition, and a subsequent burst of code frequency in the same vertical retrace period may revert this flip-flop. It is also clear that in accordance with this invention the code pulses may be inserted between equalizing pulses or the like in advance of the vertical pulse time. In that case, the vertical pulse may be available to further modify a code condition established by these preceding code pulses.

Referring now to the signals available on lines 570 and 572, these are employed to control a circuit comprising a delay line. The video signals are passed through the delay line conformably with commands in the form of signals on lines 570 and 572. Thus, instead of developing delayed horizontal driving pulses, as in the circuit of FIG. 4, in the embodiment of the circuit now being described, a standard horizontal driving pulse is employed and the video signals are selectively delayed.

Continuing to refer to FIG. 5A the delay line is designated generally 580 and includes a first section 582, a mid-tap 584 and a second section 586. Any one of a number of commercially available delay lines may be used. In accordance with usual practice, the delay line should terminate in its characteristic impedance. Resistors 571 and 573 may serve this purpose.

Referring now to the circuitry associated with the delay line 580, video signals from the television receiver and preferably from the socket of the cathode ray tube are applied directly to a cathode follower circuit connected to the left side of tube 588. This circuit may be biased to positive 150 volts applied to line 590 and the video signals may be clamped to this voltage by crystal diode 592. As the left-hand grid of tube 588 is driven conformably with the video signals, the cathode-anode path will conduct correspondingly and the right-hand side of the tube, which is operated as a grounded grid amplifier, will produce a video signal at a point 594 without delay, when the right grid is moved positive to permit conduction. That is, in this case neither section of the delay line is active in the circuit.

The video wave form in the cathode follower circuit of the left-hand side of tube 588 will also be applied over line 596 to the delay line. At the mid-tap 584 the delayed video will drive the left-hand side of a tube 598, which is to be operated as a grounded grid amplifier, and video signals delayed a first given amount will be available at point 600 in the left plate circuit of this tube. Similarly, video signals delayed through both sections 582 and 586 of delay line will drive the right-hand side of tube 598 as a grounded grid amplifier and the twice delayed video signals will be available at point 602.

It will be noted that points 594, 600 and 602 are connected in common to line 604 on which video signals are available for application to the television receiver tube. This common connection existing, it will be obvious that all three sets of video signals cannot be employed simultaneously.

A selection of only one set of video signals is accomplished by control of the respective grids of the right-hand side of tube 588 and the left-hand and right-hand sides of tube 598. The voltages of these grids are controlled by the signals on lines 570 and 572 as will now be explained.

Still referring to FIG. 5A what may be conveniently termed an exclusion tube 606 is provided with accompanying circuitry. This exclusion circuit operates as follows: when a positive wave form appears on line 570 the undelayed video will be selected by the right-hand side of tube 588. This will occur regardless of whether there is or is not a positive wave form on line 572. The positive wave form on line 570 is applied directly, or through a capacitor 610, to the left-hand grid of tube 606. Under this condition, the left-hand side of tube 600 conducts and the point 612 in its plate circuit drop in potential. This negative wave form is coupled through resistor 614, which, for example, may be 10 megohms to the left-hand grid of tube 598. This maintains the left side of tube 598 in cut-off condition. Additionally, the left-hand plate of tube 606 is coupled through a resistor 611 to the right-hand grid of tube 598. For this reason, the right-hand side of tube 598 is also held in cut-off condition.

When a positive wave form is present on line 572, the left-hand side of tube 598 will tend to conduct due to coupling of the right-hand grid through resistor 616 to line 572. However, the positive wave form on line 570, applied as just stated to the left grid of tube 598 through the left-hand side of the tube 606, will supersede this voltage. In an illustrative example, where resistor 614 is 10 megohms, resistor 616 may be two megohms.

When a positive wave form is present on line 572, and not on line 570, the video delayed through section 582 of the delay line is selected. This is accomplished by means of the right-hand side of tube 606. When the positive wave form is supplied to the right-hand grid of tube 606, its plate potential drops, and the right-hand grid of tube 598 is cut off due to coupling of the right-hand plate of tube 606 to the right-hand grid of tube 598 through resistor 613. Accordingly, in the presence of a positive wave form on line 572 and in the absence of a positive wave form on line 570, video from the center tap 584 of the delay line is selected.

If positive wave forms are not present on either line 570 or 572, the video is selected from the right-hand side of tube 598. This will automatically occur because in the absence of the positive voltages on both lines 570 and 572, both plates of tube 606 are at their relatively high potential. Both plates being at high potential, the right-hand grid of tube 598 is above cut-off due to the averaging effects of the resistors 611 and 613.

It will be observed that three conditions are possible, as follows: the undelayed video is selected through the right-hand side of tube 588 if there is positive wave form on line 570, regardless of the condition of line 572. Second, the first delay is selected through the left-hand side of tube 598 when there is a positive wave form on line 572 and not on line 570. Third, the final delay is selected through the right-hand side of tube 598 when there is no positive wave form on either line 570 or 572. When there is a positive wave form on both lines 570 and 572, the condition is the same as the first, namely, the undelayed video is selected in the right-hand side of tube 588.

While the operation of the exclusion circuit associated with tube 606 is though to be entirely clear, an illustrative set of resistor values is shown in FIG. 5A, to aid in the assembly of a suitable circuit.

The circuit shown in FIGS. 5A and 5B also includes an arrangement for distorting the operation of the receiver in some prominent manner whenever particular combination of bursts of code frequencies are employed. Reference is made to a group of single pole-single throw switches 710–716 inclusive (FIG. 5B), these being further designated by legends indicating days of the week, Sunday-Saturday, inclusive. Each of the switches 710–716 is arranged to make contact between a bank of three resistors each 710'–716' and a common line 718. The line 718 extends to the grid of tube 720. A trunk line 722 leading to the resistors of banks 710'–716' includes six conductors, each conductor being connected to one of the plate circuits of the respective flip-flop circuits 536, 538 and 540. The tube 720 is operated, for example, so that if the potential line 718 should be substantially equal to the higher potential level which the three connected flip-flop plate circuits can assume, conduction through tube 720 will be established. Otherwise, tube 720 is cut off. In the case of conduction the plate of tube 720 will be at a relatively low potential due to the voltage drop across the plote load resistor. In this case, potential available on output line 724 may serve a predetermined purpose. If for example the switch 710 is closed, the potential applied to line 718 will be based upon the potential applied by virtue of connection of the three resistors 710' to three of the six conductors of line 722. Where it happens that each of these conductors is connected to the plate of a flip-flop circuit, and each is at its lower potential during a given horizontal sweep period, the line 718 will be at that potential. If so, as previously stated, tube 720 will be cut off. However, if one or more of the three flip flop plate circuit conductors is at a higher potential, the potential in line 718 will be a some step above the lowest possible potential. This will be caused by the averaging effect of the three resistors 710'. The tube 720 may be operated so that at any one of these steps the tube will conduct to a certain degree, placing the potential on line 724 at a lower potential. This differential potential on line 724 may be employed in any convenient manner to disrupt the operation on the television receiver circuit. For example, the audio signals could be disrupted, the video signals disrupted, etc., as by altering the bias on a tube, etc.

It will be apparent that the provision of the disruption circuit just described provides an infinite number of code arrangements to prevent unauthorized reception of transmitted signals. For example, each switch 710–716 may have associated therewith, as indicated by legend in FIG. 5B, a day of the week. It is intended that codes for each day of the week, each hourly program or any other suitable time period may be scheduled for a code wherein a certain condition will obtain as to the possible codes. The possible codes would not include one wherein the potential on line 718 could be modified so as to activate the disruption circuit by raising the potential on line 724 into a disruption region. This aspect of decoding the transmission will be described still further hereinbelow.

Another manner of delaying the video signals in accordance with the invention is shown in FIG. 6. In this circuit the video signals are first gated and then applied to the delay line. This is to be distinguished from the circuit in FIG. 5 wherein the video signals are first delayed and then applied to the gating tubes. In FIG. 6 the video signals are passed through a cathode follower circuit including tube 730 and applied to output line 732 which branches into lines 734, 736 and 738. The delay line in FIG. 6 is again designated 580 with sections 582 and 586 as in FIG. 5A. In line 734 there is provided a first crystal diode 740 and a second diode 742, opposed as shown to either side of a point 744. Point 744 is connected in a voltage divider circuit including resistors 746 and 748 connected to a point 750 in the cathode circuit of gating tube 752. Beyond crystal 742 a resistor 754 is provided to ground. Further beyond crystal 742, connection is made over line 756 to the input side of delay line section 582.

The conduction in tube 752 whenever the grid is at a high potential will be such that the cathode follower potential at point 750 will not exceed a predetermined amount, say 30 volts. Whenever conduction through the tube is cut off, the points 750 and 744 will be substantially at ground potential. In this case it will be apparent that no video can flow through crystals 740 and 742 to enter the delay line. However, when the grid of tube 752 is at a higher potential, the stated conduction will occur, limited to a suitable value by grid resistor 758, the point 744 will be at a relatively high potential and video may flow through the crystals and thence through the delay line to video output line 760. The video on line 760 will be twice delayed and will correspond to the video obtainable in the right-hand side of tube 598 of FIG. 5A.

The delay line 580 is provided at either end with resistance to ground in value equal to the characteristic impedance of the line. At the input to section 582 of the delay line the characteristic impedance is designated 762. At the output side of delay line section 586 resistors 764, 766 and 768 go to make up the characteristic impedance. Further resistors 770 and 772 are connected in series from the mid-tap 584 of the delay line to ground.

The video signals available on line 736 and 738 are similarly gated by crystal diode gating circuits connected to tubes 774 and 776, respectively. Both tubes 774 and 776 and associated circuitry are identical to the tube 752 and its circuitry. The grid of each of these tubes is under control of square waves applied as lines 570 and 572 corresponding to these lines as so designated in FIG. 5.

An exclusion circuit including tube 606 shown in both FIGS. 5A and 6 may be employed in the latter circuit to perform the exclusion function as in the circuit of FIG. 5A for gating the delayed video signals.

The output of the gate circuit of tube 774 is on line 778 and is applied to the second section 586 of the delay line by connection at point 780 between resistors 770 and 772. The video now available on line 760 will conform to the video delayed by a single section of the delay line through the left-hand side of tube 598 of FIG. 5.

Nondelayed video is gated through thegating circuit associated with tube 776 and is conveniently coupled to line 760 by connection at point 782 between resistors 766 and 768. The video thus obtained will correspond to the undelayed video gated through the right-hand side of tube 588 in FIG. 5.

For selecting proper resistors for preventing reflections in the delay line 580 as used in FIG. 6, a representative set of perameter values is shown on the drawing, assuming the characteristic impedance of the line to be 2500 ohms.

The switches 710–716 and resistance bank 710'–716' can be used in connection with what may be conveniently termed a day-of-the-week-code program. The purpose of such an arrangement will be to avoid any tendency of an otherwise authorized receiver owner, having operated a push-button to punch a record card for one day's program, to attempt to establish the proper code by again operating that button on a later day. This assumes that the same code might otherwise be used on two or more days, and an opportunity for thus using a given day twice might exist. A typical arrangement for this operation is provided as follows: Referring now to FIG. 7, a modification of FIGS. 3A and 3B is shown wherein the tube 282 of FIG. 3A instead of having its plate connected directly to the conductor between the crystal 274 and the left-hand grid of tube 276 by line 275, has a conductor 800 connected to the plate of tube 282. A second conductor 802 returns the plate circuit to the line 275 between crystal 274 and tube 276. The conductor 802 extends to the movable contact arm of a switch 804. The line 800 extends to one contact 806 thereof. The previously mentioned twin conductor lines 68, 70 and 72 (FIG. 3) are also involved in the circuit being described and are similarly designated in FIG. 7. The conductors of line 68 extend to the contacts of a switch 808, the two conductors of line 70 extend to switch 810 and the two conductors of line 72 extend to a switch 812.

The upper contacts of switches 808, 810 and 812 connect to the conductor of lines 68, 70 and 72 carrying what may be referred to as the negative going wave form generated either in the counting chain or in the random pulse chain shown in FIG. 2. The lower contacts of switches 808, 810 and 812 connect to the lines carrying the companion positive going wave forms. The movable arms of switches 808, 810 and 812 are shown in FIG. 7 as connected to the upper contacts carrying the negative going away forms, but this is only one situation. The movable contacts of switches 808, 810 and 812 are otherwise commonly connected to a line 814 connected to the left-hand grid of tube 816. The left-hand plate of tube 816 is coupled to the right-hand grid of this tube and connection is made at point 818 in the right-hand plate circuit to line 820, for connection to the line 284 in FIG. 3 which is coupled to the grid of gate tube 282.

The just described circuit connected to switches 808, 810 and 812 and tube 816 operates as follows: The negative going wave form at the upper contact of switch 808 will cycle at 30 cycles per second, to follow the herein previously established example. This wave form is shown in line A of FIG. 8. The upper contact of switch 810 will carry a voltage which will cycle at 15 cycles per second as shown in line B of FIG. 8, and the upper contact or switch 812 will carry voltage at 7.5 cycles per second, as shown in line C of FIG. 8. Relatively high value resistors 822 are provided either before or after the switches 808, 810 and 812 for mixing the signals and applying them to the left-hand grid of tube 816. Accordingly, the added voltages on the left-hand grid of tube 816 are as shown in line D of FIG. 8. Whenever all three signals are at their maximum positive excursion—at 0 volts in the example—the left-hand grid of tube 816 will assume this potential. Conversely, when all of the signals are at their maximum negative excursion—an equal amount for each—the grid will assume this lower condition. However, when one or more of the signals is at a different potential, the grid will assume an intermediate condition. With three signals applied, there will be a total of four possible grid potential levels. The circuit is thus an addition circuit and the wave form will be in accordance with line D of FIG. 8. This wave form will appear at the left-hand grid of tube 816. If now the left-hand side of tube 816 operates so that it cuts off when the grid passes to the second lower operating level, the left plate wave form will be shown in line E of FIG. 8. This wave form is coupled over line 824 to the right-hand grid of tube 816. There is also applied to the right-hand grid of tube 816 over line 826 the true 15 cycle wave form, which is coupled through the high resistance 828. Accordingly, there will be applied to the right-hand grid of tube 816 a wave form as in line F of FIG. 8. Conduction of the right-hand side of tube 816 may be established between the extremes shown in line F of FIG. 8 so that the right-hand plate operates in accordance with line G of FIG. 8. As previously stated, connection is made from the right-hand plate at point 818 over line 820 and then line 284 to the grid of tube 282. The wave form on the plate of tube 282 will then be as shown in line H of FIG. 8.

It will be noted that the line 800 is connected to the grid of tube 830, the plate of which is connected over line 832 and through resistor 834 to ground. The upper contact of the right-hand section of switch 804 is connected to line 832. Thus, line 802 with switch 804 in its upper position carries an inversion of the signal on line 800 derived from the plate of tube 282.

The total effect of the circuits just described in the immediately preceding paragraphs is that one of the gating signals, viz, the 15 cycle signal, is not permitted to be at its positive excursion when the other two signals, 30 cycles and 7.5 cycles, are at their maximum positive excursion. This is demonstrated in line H of FIG. 8 which shows a modified 15 cycle wave form. The operation of the circuit of FIGS. 3A and 3B as modified appears in lines j and k of FIG. 3D.

In the day of the week code operation, the flip-flop circuits 536, 538 and 540 are controlled at the receiver by the particular combination and permutation of bursts of code frequencies received during a given horizontal retrace period, in conjunction with the switching effected by the contact of the record card with each set of terminals 560. The combinations and permutations of bursts of code frequencies are determined at the transmitter soley by the progressive changing of potentials on the grids of gate 282, 234 and 258 in FIGS. 3A and 3B. Once these gating signals are obtained, they not only trigger the oscillators 92', 108' and 114' of FIG. 3A, but they also operate the switch matrix at the transmitter which corresponds to the matrix using the card as a switching element at the receiver. The switching matrix at the transmitter is the previously mentioned circuit designated 80 in FIG. 2. The details of such a matrix are shown within the chain line 16 in FIG. 2 of Pat. No. 3,274,333 mentioned hereinabove.

Referring now particularly to the switching matrix at the transmitter, if one of the switches within the matrix is not set as planned to conform to the switching which will be effeced by the record card at the receiver, there will be an obvious discrepancy as to what the combination of gating signals will produce at the transmitter, on the one hand, and at the receiver, on the other hand. If one of the switches at the transmitter is not set according to the record cards to be used, at certain times while the system cycles, the cameras will rely upon one code delay period while the receiver will rely upon another. It is thus apparent that the switching matrix at the transmitter must correspond to that of the receiver.

I will be apparent at this point that the sole means for synchronizing the coding at the receiver with the coding at the transmitter is by the permutations of the bursts of code frequencies transmitted among the standard synchronizing signals. It will further be apparent that a total of eight different situations may exist in binary fashion. That is, in the illustrative example being given there are three possible codes of distinct frequencies, which may be found in binary manner, viz, on or off. Thus, the total number of code combinations is $2^3=8$.

Thereinabove, and hereinbelow, the illustrative example proceeds on the basis of a so-called day of the week code. However, as will be fully developed, the general concept is the suppression of one or more code numbers out of a greater number, at various time intervals. That is, the program could be set up on the basis of code changes every hour, etc.

By means of the detectors 520, 522 and 524 and flip-flops 536, 538 and 540, when interrelated by a suitable record card capable of performing a switching function at terminals 560, each switch 710–716 will be capable of actuating the disruption tube 720 whenever other than predetermined series of code numbers are repetitiously transmitted over the air in the form of given ones of the above mentioned eight possible code combinations. It will thus be apparent that, notwithstanding a code in use for an entire week or other period of time, the code may be made inoperative for subintervals of time, by use of switches 710–716.

Reference to the circuitry including switches 808, 810 and 812 in FIG. 7, makes it apparent, these switches being two-position switches, and there being three of the switches, that eight possible binary combinations are available. As has been explained hereinabove, the circuitry connected to tube 816 causes the normal operation of the exemplary 15 cycle gating signal to be cut-off whenever the other two gating signals are at their positive excursion. Thus, when switches 808, 810 and 812 are set differently in accordance with the eight possible binary combinations, it is necessary to alter the 15 cycle gating wave form accordingly. It is for this reason that switch 804 is provided, this section bringing into operation tube 830 for inverting the gating wave form at the required intervals. Switches 804 and 810 should operate together, and are therefore linked as shown by dash line 805.

With the circuit operative to alter the 15 cycle wave form whenever the other two wave forms are at their positive excursion, every repetitive cycle of codes transmitted with a given setting of switches 804, 808 and 812 will create a situation where one of the possible eight code numbers is missing. Now, if the particular one of the resistor banks 710–716 is connected by the corresponding one of the switches 710–716, the decoding function will proceed properly. However, if an otherwise authorized receiver has attempted to operate the incorrect switch 710–716 for a predetermined sub-interval of time, e.g., a day, the coding will proceed properly except that once every repetitive cycle the disruption tube 720 will be caused to operate. This disruptive operation will come about because the code number which should be avoided is not avoided.

The disruption circuit will be placed in operation once for every occurrence of the wrong code number being transmitted. Normally, this would be at a rate of 7.5 cycles per second, the period of slowest gating wave form. However, a suitable capacitor circuit (not shown) may be included in the disruptive circuit to substantially hold over from one occurrence to another. Thus, even at the relatively slow disruption rate of 7.5 per second, the operation of the receiver at some vital point may be totally disabled.

The number of code combinations applicable to FIGS. 3 and 5 is, for all practical purposes, unlimited. No attempt can reasonably be made to demonstrate all of these combinations and permutations in this specification. However, an exemplary and relatively simple example will be given.

Referring to FIG. 5B, an exemplary card 860 is shown in proximity to the terminal banks 560. The card is assumed to be of the type carrying a printed circuit. By use of such card, contact at the terminals of each terminal bank will cause circuits to be completed through the conductive ink. At the uppermost set of terminals a conductive ink line 862 is shown connecting terminals B, 3 and X. In the next lower bank of terminals conductive line 864 is shown connecting terminals V and 4. Next lower is a conductive ink line 866, shown connecting terminals A, 2 and Y. At the lowermost set of terminals conductive ink line 868 is shown connecting terminals B, V and 1.

It will be apparent that the incoming vertical pulse applied to terminals V will be returned through terminals 4 and 2 to set flip-flops 538 and 540 so that conduction occurs in their right-hand plate circuits. Following the vertical pulse, if a positive pulse is applied to the B terminals, the flip-flop 538 will be shifted and the terminal X will then carry a relatively high potential. This situation will obtain whether or not the terminal B receives a negative pulse which would shift the flip-flop 540. If the code received is only a pulse at B, the high potential will be placed at terminal X which is connected to line 570. It will be recalled that the relatively high potential on line 570 causes nondelayed video to be selected in the right-hand plate circuit of tube 588.

If a negative pulse is applied to the A terminals, but not to the B terminals, this pulse will be applied through conductive ink line 868 to shift flip-flop 540 so that a relatively high potential will be applied to terminal Y through ink line 866. At the same time, no B pulse having been received, there will be no high potential on line 570. The high potential will be only on line 572. This is the criteria for selecting the video delay through the first section of the delay line.

The third code for selecting the video delayed through both sections of the delay line is that a potential appear on neither line 570 nor line 572. This will occur automatically with the sample card shown because neither the A nor B terminals will receive negative pulses and no C terminal is connected.

As for a suitable setting of switching matrix at the transmitter for use of the card 860 shown in FIG. 5B, an analogy may be drawn to the matrix within the dash line 16 in FIG. 2 of the above-mentioned Pat. No. 3,274,333. A portion of the matrix is shown in FIG. 9, using the same reference characters with 900 added thereto. Accordingly, switches 917–922 and 926–928 are shown, corresponding to switches 17–22 and 26–28 of the copending application. It will now be apparent, referring to FIG. 8 of the present application, that where nondelayed video is to be transmitted, the horizontal pulse for use at the camera will be derived through switch 926 which will be passed whenever switch 917 is set to negative A and switch 920 is set to positive B. When these connections are made, the positive B and negative A will both be at substantially ground potential and accordingly the pulse will be conducted through the associated crystal 933. At any level below ground, crystal 933 will be biased to not conduct.

At the same time, the switch 918 will be set to positive A and the switch 921 to negative B. This has two ramifications. First, at this setting when B is positive and and A negative, negative B and positive A will average out through switches 918 and 921 to be substantially below ground potential. Thus, there will be no conduction through crystal 934. Second, when B is negative and A postive, there will be no conduction through crystal 933, but there will be conduction through crystal 934. Thus, the second pulse providing first partial delay will be available through switch 927 and crystal 934.

When both B and A are negative, in accordance with the settings of switches 919 and 922 as shown in FIG. 9, the third or complete delay pulse will be selected at the transmitter by default. In other words, switch 928 can be set to a neutral position in this instance.

The positive and negative C lines are not shown in FIG. 9, because they are not necessary in the illustrative example just given. However, it will be apparent that when the system is expanded for creating additional code arrangements, the C lines can be employed to advantage.

Referring to FIG. 5B, the card 860 which effects the switching may conveniently be mailed to the owner of the authorized receiving set. Moreover, when the switches 710–716 are operated, a punch associated with the switch operator may punch the card to designate a program which has been viewed. The card may then be returned to the programmer for tabulating the charge to be assessed against the owner of the television receiver. Thus, apart from the use of the card at the decoder of FIGS. 5A and 5B, the card may otherwise be employed in a manner incident to the conducting of the televising enterprise.

Without limitation, an illustrative structural device for receiving the card 860 and punching the same as described above is shown in FIGS. 10 and 11. A suitable casing 950 is provided having a slot 952 lengthwise along the top into which a code card may be inserted. The card, designated 860 to conform to the designation in FIG. 5B is shown having printed visible matter in blocks 954 thereon. The card is further characterized by segments 956 of conductive ink to which electrical contact may be made by the terminal brushes 560', positioned as shown in FIG. 10. These brushes are connected to terminals 560 shown in FIG. 5B. The conductive segments 956 are joined by conductive paths designated 958 in the showing in FIG. 11, these paths being arranged in accordance with the code as discussed in connection with FIG. 5B. The conductive paths 958 may be covered up by plys of paper of which the card is fabricated to avoid disclosure of the code.

In front of each section of the card 860 having a printed block 954 there may be provided a swinging arm 960 hinged as at 962 and having affixed thereto an operating button 964. An arm 966 may extend from the operating button through a slot 968 in the casing 950 for attachment to the swinging arm 960 to 968. A double detent spring 970 may be provided at the lower end 972 of arm 960 for maintaining this arm in one of two positions. A card punch 974 fixed to arm 960 may be provided to pass through the card at point 976. Thus, an aperture 978 may be punched in the card in proximity to each of the printed blocks, as shown in FIG. 10, whenever the viewer selects a program. The aperture 978 will serve as a permanent record on the card of programs which have been viewed.

Movement of the arm 960 to its operated position to puncture the card will also result in closing of switch contacts 978 and 980. Each set of these contacts constitute one of the switches 710–716 in FIG. 5. The upper contact 978 may be moved to engage contact 980 by contact operator 982 attached to the arm 960.

It will be now apparent that there is a direct correlation between the day or other time period as printed on the card 860 in block 954, the puncturing of the card as at aperture 978, and the closing of a particular one of the switches 710–716. Thus, it will be fully apparent that after a viewer has viewed one program causing a puncture of the card 816 at a particular program, for the next program he cannot go back and operate the same switch operator 964. If he does so, the reception of the program will be disrupted due to the operation of the disruption circuit which includes the tube 720 of FIG. 5. The disruption circuit operates differently each day if the switches 804, 808, 810 and 812 are set differently each day, as hereinabove explained.

As intended hereinabove, the generation, transmission and detection of the code signals may include means for producing bursts of uniform pulses of discrete repetition rates, or may include means for otherwise distinguishing between code signals. As previously mentioned, distinction may be based on pulse width differences, pulse spacing differences, pulse count differences, etc. Thus, no limitations to the specific system hereinabove described in detail is intended.

The scrambling of the transmission may be made further complete by inverting the video signals. Referring to FIG. 1B, which is a modification of FIG. 1, a video inverter circuit 1010 may be connected to the mixing circuits 21 as shown in FIG. 1. A suitable video inverting circuit is shown in FIG. 12, wherein a line 1011 carrying video and blanking signals is coupled to the grid of a tube 1012. The waveform on this grid is as shown in line a of FIG. 12A. The inverted signal as at point 1014 in the plate circuit of tube 1012 is shown in line b of FIG. 12A. The waveform as shown in line b of FIG. 12A is not usable because the blanking level has been inverted and it is necessary to reestablish the proper blanking level before it can be used with the remainder of the television system. Accordingly, the inverted signals as shown in line b of FIG. 12A and appearing at point 1014 in the plate circuit of tube 1012 are coupled over line 1016 to the control grid 1018 of a gating tube 1020. These signals are clamped with respect to ground by means of crystal diode 1022 to establish a reference level. A positive waveform corresponding in time occurrence and duration to the blanking waveform obtained at a convenient point (not shown) in the transmiter synchronizing signal circuits may be applied to line 1024 and amplified in tube 1026. A negative waveform obtainable in the plate circuit of the tube 1026 may then be coupled to the suppressor grid 1028 of the gating tube 1020. This blanking waveform is shown in line c of FIG. 12A. Accordingly, at point 1030 in the plate circuit of tube 1020 there is obtained the reinverted video with the positive blanking inserted, as shown in line d of FIG. 12A. In order to provide a pedestal control which determines the relation of whites to blacks, the signal at point 1030 is D.C. coupled through crystal diode 1032, the plate of this diode being biased by appropriate resistors between a positive bias potential on line 1033 and a negative bias potential on line 1034. A potentiometer 1036 is provided for varying the amount of relative voltage in the resistive network and the diode can therefore be made to pass only that signal below the diode plate voltage. Thus, all or part of the pedestal shown in line d of FIG. 12A can be eliminated.

The waveform of line d of FIG. 12A is coupled to the grid of an inverter tube 1038 and the signal is again clamped to ground by means of crystal diode 1040. The waveform on the grid of tube 1038 is shown in line e of FIG. 12A. A potentiometer 1042 is provided in the plate circuit of tube 1038 and from this potentiometer there is obtained on line 22′ the now inverted waveform as shown in line f of FIG. 12A. Line 22′ is similarly designated in FIG. 1B as being the line now leading to the mixing circuit 21.

At the receiver the video after separation from the synchronizing signals may be conveniently inverted by use of inverter tube 1044 (FIG. 5A). A switch 1046 is provided in line 604 of FIG. 5A to select between normal and inverted video, to conform to transmission as radiated.

All of the preceding detailed description is only for purposes of setting forth exemplary embodiments of the various features of the present invention. Accordingly, it is intended that the scope of the invention will be determined from the appended claims.

What is claimed is:

1. In a scrambled television transmission system having a transmitting end and at least one receiving end, means at the transmitting end for generating code controlling gating signals, the gating signal generating means including means for generating square wave gating signals on conductor sets of two conductors each, the two conductors of each set carrying opposed voltages, and means for altering one of the gating signal wave forms to prevent all of the gating wave forms from simultaneously occupying one of two possible excursions, said altering means including means for adding voltages one from each of the sets of conductors and producing a given level of voltage only when all of the voltages on the selected ones of sets of conductors go to one of two opposing maximum excursions, and means responsive to the last-mentioned voltage for changing said one of the wave forms to the other of its maximum excursions.

2. In a scrambled television transmission system having a transmitting end and at least one receiving end, means for transmitting predetermined combinations of discrete code signals from the transmitting to the receiving ends, means at the transmitting end for selectively suppressing at least a predetermined one of the total number of code signal combinations during a given period of transmission, a plurality of individually operable switch means at the receiving end of the system, and receiver disruption circuit means connected with said switch means and responsive to the transmitted code signal combinations for continually disrupting the operation of the receiver by causing alternate normal and abnormal operation thereof during said given period upon operation of one of said switch means other than the switch means identifiable with the suppression of a given code signal combination.

3. In a scrambled television system having a transmitter and at least one receiver respectively with encoding and decoding circuits each of which includes its own plurality of internal circuits which can be variably interconnected and of the type wherein the transmitted video signals are variously changed from one to another of a plurality of modes in accordance with a code and remain in any given mode for at least one of a plurality of successive time intervals, and in which the video signals and synchronizing signals are transmitted as modulations on the same carrier, the improvement comprising a plurality of signal sources at the transmitter for generating a plurality of simultaneously occurring actuating signals each of which recurrently changes amplitude as between two levels for actuating said encoding circuit, all of the actuating signals representing by their amplitudes at a time between any two adjacent ones of said time intervals, in conjunction with the instant interconnections of said internal circuits for said encoding circuit, the mode caused to be in effect during the ensuing time interval, a plurality of signal generators for providing a corresponding plurality of differently characterized output signals, a plurality of gates respectively coupled between said sources and generators, means for operating said gates one after another between each two adjacent ones of said time intervals and respectively between successive synchronizing signals therein to allow gating of the actuating signals to a respective generator, each generator being responsive to provide its own output signal if the actuating signal gated thereto is then at one of its levels but not the other, each different possible combination that can occur by the presence and absence of output signals between said time intervals being a different possible code signal combination, means for combining and thereby transmitting any generated output signal with the video and synchronizing signals on said carrier, means at the receiver for separating any transmitted output signal from the video and synchronizing signals, a plurality of means coupled to the separating means and respectively responsive to all the different possible ones of said output signals, for deriving signals therefrom for controlling the operation of said decoding circuit in conjunction with the instant interconnection of said internal circuits for the decoding circuit.

4. A system as in claim 3 wherein the receiver includes disruption circuit means responsive to detection at the receiving end of at least one of the possible code signal combinations for disrupting the operation of the receiver.

5. A system as in claim 4 wherein the transmitter includes means for causing at least one of the possible code signal combinations to be suppressed during predetermined time intervals, and the receiver disruption circuit means includes a plurality of discrete manually operable switch means with individual identification means for indicating which predetermined one of the switch means to operate to avoid disruption by the receiver disruption circuit means during said predetermined intervals of time.

6. A system as in claim 5 wherein the receiver includes means for receiving a record card having code data for completing the internal decoding circuits.

7. A system as in claim 6 wherein the disruption circuit also includes means coupled with the disruption switch means for puncturing the record card in a predetermined area of the card, the arrangement being such that for predetermined intervals of time a given one of the switch means is to be operated to avoid energization of the disruption circuit means by reason of predetermination of the code signal combinations being operative upon the disruption circuit means only by completion of the disruption circuit means through other than the correct one of the individually operable switch means.

8. In a scrambled television system which includes means for generating video and synchronizing signals, the improvement comprising the combination of: encoding circuitry including a plurality of circuits with simultaneous outputs changeable at least between two values, means for causing said outputs to change, means including switching means for causing said video signals to be in a different one of a plurality of modes at different times in accordance with the combined instant values of said outputs at such times; means for signifying the different instant output values at such times including a plurality of signal generators for providing a corresponding plurality of differently characterized signals, a plurality of gates for coupling the outputs of said circuits respectively to said generators when enabled, each generator being responsive to provide its respective signal only if the output gated thereto has one of said values but not the other, means for enabling then disabling each gate one after another and for causing any so generated signal to begin and end between the occurrence of two most adjacent synchronizing signals; and means for combining the video signals, synchronizing signals and the generated signals onto a common carrier.

9. A scrambled television system comprising means for generating video signals, means including switching means for coding said signals so that they will appear in a different one of a plurality of modes in succeeding time intervals, means coupled to said coding means for generating therefor a plurality of different control signals, only one control signal being generated between any two immediately successive intervals, each different control signal in conjunction with said switching means being operative to determine the mode of said video signals for an interval, and means for suppressing at least a given one of the different possible control signals after it is generated.

10. A system as in claim 9 wherein the control signal generating means generates a predetermined number of signals in differing combinations, each combination making up one of said control signals and the suppressing means selectively suppresses at least one of the signals in at least one of the combinations thereby eliminating that combination.

11. A scrambled television system comprising means for generating video signals, means including switching means for variably coding said signals so that they will appear in a different one of the plurality of modes from time to time, means coupled to said coding means for generating therefor a plurality of different control signals respectively at different times, each control signal including a combination of a plurality of separate sets of binary voltage levels, each different control signals being a different combination of said voltage levels and being capable in conjunction with said switching means of determining the mode of said video signals until the occurrence of the next control signal, and means for suppressing at least one given control signal including means for changing a generated voltage level in said one control signal from one to its other binary value thereby making said given control signal appear as one of the other possible control signals.

12. A system as in claim 11 and further including means coupled to said generating and suppressing means for sequentially developing differently characterized signals representing respectively one but not the other of the voltage levels in each set thereof following any change therein by the voltage level changing means, each control signal being thereby represented by a different combination of off-on signals which when on are distinguishable from one another by their different characterizations.

13. In a scrambled television transmission system having a transmitting end and at least one receiving end, means at the transmitting end for generating $n$ predetermined combinations of discrete code signals for transmission to the receiver end, means at the transmitting end for selectively suppressing at least one of the $n$ possible code combinations during a given period of transmission and for selectively suppressing other of the code combinations respectively during other periods of transmission, means at the transmitting end for scrambling the video transmission at least partially in accordance with the different combinations of code signals, means at the receiver end of the system normally responsive to all of the $n$ possible code signal combinations for effecting the unscrambling of the video transmission, means at the receiver end including a plurality of manually operable switch means and disruption circuit means responsive to the transmitted code signal combinations for disrupting the operation of the receiver, and visible indicia associated with each of the switch means for indicating a given time interval when the suppression of any given code signal combination is in effect, the arrangement being such that operation of a switch means other than a predetermined switch means identifiable with a given period of transmission will cause said disrupting due to inclusion among the code signal combinations of at least one combination which will operate the disruption means.

14. In a scrambled television system which includes a source of video signals and means for utilizing said signals, a circuit for translating the time position of video signals variously as between at least three modes comprising an electrical delay line having at least three terminals at different positions along its length, first, second, and third gating means coupled respectively to said delay line terminals, means coupling all of the gating means and delay line as a combination between said source and said utilizing means, and means for enabling said gating means mutually exclusively in response only to two binary signals, the arrangement being such that the video signals are gated to said utilizing means with a given amount of delay in response to a first combination of said binary signals, are gated thereto with a greater amount of delay in response to a second combination of said binary signals, and are gated thereto with the greatest amount of delay in response to a third combination of said binary signals.

15. In a scrambled television system which includes a source of video signals and means for utilizing said signals, a circuit for translating the time position of video signals variously as between at least three modes comprising an electrical delay line having an input and at least two outputs at different positions along its length, means coupling said course to said input for continuously delivering said signals thereto, first gating means coupling said source to said utilization means for gating the video signals to the latter without delay when enabled, second gating means coupled between one of said outputs and said utilization means for gating video signals to the latter with a first amount of delay when enabled, third gating means coupled between the other of said outputs and said utilization means for gating video signals to the latter with a second amount of delay when enabled, and means for enabling said gating means mutually exclusively in response only to two binary signals.

16. In a scrambled television system which includes a source of video signals, a circuit for translating the time position of said video signals as between at least three modes comprising an electrical delay line having at least three terminals including first and second input terminals at different positions along its length and an output terminal, first gating means coupled between said source of signals and said output terminal for gating video signals without delay to the latter when enabled, second gating means coupled between said source and said second input terminal for gating video signals to the latter when enabled to cause the so gated signals to appear at said output terminal with a first amount of delay, third gating means coupled between said source and said first input for gating video signals to the latter when enabled to cause the so gated signals to appear at said output terminal with a second amount of delay, and means for enabling said gating means mutually exclusively in response only to two binary signals.

17. A decoding circuit for a television receiver for receiving scrambled television transmissions wherein predetermined video signals are delayed with respect to predetermined synchronizing signals and driving signals based thereon, and wherein the transmission includes at least one combination of a plurality of discrete code signals, means for separating the video and code signals from the remainder of the transmitted signals, the separating means including a video signal input terminal and a plurality of channels one identifiable with each possible code signal, a plurality of memory circuit, means for coupling the memory circuits for energization by said channels of the code signals separating circuits, an electrical delay line having a plurality of terminals, a plurality of gating means respectively coupled to the delay line terminals, a video signal output terminal, means coupling the delay line and gating means between the video signal input and output terminals, and means coupling the memory circuits to the gating means for selectively enabling the gating means to gate video signals to said output terminal in accordance with a predetermined code determined at least in part by the received and separated code signals for determining the amount of delay to which predetermined of the video signals are to be subject.

18. A circuit as in claim 17 wherein the gating circuit includes exclusion circuit means for positively subjecting given series of video signals to only one delay action.

19. A circuit as in claim 17 wherein the means coupling the code signal separation channels to said memory circuits includes means operable by a code bearing replaceable record card.

20. A circuit as in claim 17 wherein the means coupling the code signal separator channels and the memory circuits includes means operable by a code bearing replaceable record card, and wherein the means coupling the memory circuits to the gating circuits also includes means operable by said code bearing replaceable record card.

21. In a television transmitter, a circuit for inverting video signals with respect to blanking signals comprising a first stage for receiving and inverting combined video and blanking signals, a source of signals coexistent in time with said blanking signals but in amplitude opposition to same as inverted and of greater amplitude, and a second stage for receiving the inverted video and blanking signals from said first stage and said coexistent signals from said source and mixing all of said signals to cause the blanking signals to be replaced respectively by said coexistent signals and to form a combination of the video and coexistent signals.

22. A circuit as in claim 21 wherein said second stage includes means which not only mixes but inverts all the signals it receives, and further including means for inverting the combined coexistent and video signals and means for limiting the amplitude of the coexistent signals when in combination with the video signals.

23. An encoding signal generator comprising: counting means having a multiplicity of stable operating conditions and randomly actuatable between said stable operating conditions upon being randomly signaled; means for randomly signaling and actuating said counting means during each of a series of spaced predetermined time intervals to effect actuation of said counting means between its aforesaid multiplicity of operating conditions for establishing said mounting means in a randomly selected operating condition at the termination of each of said predetermined time intervals; a plurality of signal generators for individually producing a signal having a predetermined identifying characteristic; means including sampling circuits for reading out the instantaneous condition of said counting means between said spaced time intervals; and means coupled to said sampling means and to said plurality of signal generators for operating said generators in accordance with the operating conditions of said counting means at the termination of each of said predetermined time intervals.

24. A secrecy communication system for translating an intelligence signal comprising: means for developing first signal components; means for obtaining from said first components second signal components and utilizing certain ones of said second signal components for effectively modifying certain ones of said first components so that said certain ones of said first components do not occur substantially in time coincidence with said certain ones of second said signal components; and means for utilizing said first signal components as modified to encode said intelligence signal.

25. A secrecy communication system comprising: encoding apparatus having a plurality of operating conditions different ones of which establishes said system in distinctly different operating modes; means for actuating said encoding apparatus between said operating conditions in accordance with control signaling representing secret code scheduling; means coupled to said actuating mechanism for deriving therefrom a modifying signal representing control scheduling related to said code scheduling; and means coupled to said modifying-signal-deriving means for utilizing said modifying signal to change the operation of said actuating mechanism in accordance with said control scheduling thereby to alter said predetermined code scheduling.

26. An secrecy communication system for translating an intelligence signal comprising: means for developing recurring signal components; means for obtaining second signal components at least some of which occur substantially in time coincidence with components aforesaid; means responsive to said recurring signal components for effectively removing at least a portion of each of said second component that time coincides as aforesaid; and means for utilizing at least a part of said recurring signal components and also said second signal components with the exception of that removed as aforesaid to encode said intelligence signal.

27. A system as in claim 26 wherein said developing means causes said recurring signal components to be periodic.

28. A system as in claim 26 wherein said developing means causes said recurring signal components to recur randomly.

29. A system as in claim 26 wherein developing means causes said recurring components to be in a plurality of series of components with the components of different series being of different timing, said second signal components being obtained from the components of one of said series, said removing means being operative in response to a combination of said plurality of series of components to effectively remove at least a portion of each component in said one series that is time coincident as aforesaid, said utilizing means being operative to encode said intelligence signal in response to said one series as operated upon said removing means and to the remaining plurality of component series besides said one series.

30. A secrecy communication system for translating an intelligence signal comprising: means for developing first signal components, means for developing second signal components certain ones of which may occur substantially in time coincidence with certain ones of said first signal components, means for utilizing said certain components of one of said first and second signal components for effectively removing the said certain ones of the other of said first and second signal components, and means for utilizing at least said other of said first and second signal components with the exception of the said certain components removed therefrom to encode said intelligence signal.

31. An encoding signal generator comprising:
a plurality of signal generators for individually producing a signal having a predetermined identifying characteristic,
signal producing means for developing on each of a plurality of lines signals which have randomly occurring on and off conditions that occur randomly not only on each line but from line to line, and
means including a plurality of sampling circuits respectively coupled between said lines and generators for reading out the instantaneous condition of said signal producing means during successive spaced time intervals and thereby operating said generators in accordance with the instant condition of said signal producing means during the respective time interval.

References Cited
UNITED STATES PATENTS 2,424,350  7/1947  Cawein _____ 178—7.1
2,724,740  11/1955  Cutler _____ 325—38.1

RICHARD MURRAY, Primary Examiner
H. W. BRITTON Assistant Examiner

U.S. Cl. X.R.
178—6